United States Patent
Chen et al.

(10) Patent No.: US 11,833,497 B2
(45) Date of Patent: Dec. 5, 2023

(54) COPPER-CONTAINING BIMETALLIC STRUCTURES, SYNTHESES THEREOF, AND USES THEREOF

(71) Applicant: Honda Motor Co., Ltd., Tokyo (JP)

(72) Inventors: Shutang Chen, Livermore, CA (US); Gugang Chen, Palo Alto, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/230,679

(22) Filed: Apr. 14, 2021

(65) Prior Publication Data
US 2022/0331788 A1    Oct. 20, 2022

(51) Int. Cl.
| | | |
|---|---|---|
| *B01J 31/24* | (2006.01) | |
| *C07F 15/04* | (2006.01) | |
| *B01J 35/00* | (2006.01) | |
| *C07F 15/02* | (2006.01) | |
| *C07F 15/06* | (2006.01) | |

(52) U.S. Cl.
CPC ............ *B01J 31/24* (2013.01); *B01J 35/0006* (2013.01); *C07F 15/02* (2013.01); *C07F 15/04* (2013.01); *C07F 15/06* (2013.01)

(58) Field of Classification Search
None
See application file for complete search history.

(56) References Cited

U.S. PATENT DOCUMENTS

2020/0156157 A1*    5/2020    Chen ..................... B22F 1/07

OTHER PUBLICATIONS

Liu et al. RSC Advances, 7, 37823-37829 (Year: 2017).*
Bhol, P.; Bhavya, M. B.; Swain, S.; Saxena, M.; Samal, A. K., "Modern chemical routes for thcontrolled synthesis of anisotropic bimetallic nanostructures and their application in catalysis", Frontiers in Chemistry, 2020, 8, doi: 10.3389/fchem.2020.00357.

(Continued)

*Primary Examiner* — Yun Qian
(74) *Attorney, Agent, or Firm* — PATTERSON + SHERIDAN, L.L.P.

(57) ABSTRACT

Aspects of the present disclosure generally relate to copper-containing bimetallic structures, to processes for producing the copper-containing bimetallic structure, and to uses of the copper-containing bimetallic structures as, e.g., catalysts. In an aspect, a process for forming a bimetallic structure is provided. The process includes forming a mixture comprising a first precursor and a second precursor, the first precursor comprising copper, the second precursor comprising a phosphine. The process further includes introducing a third precursor with the mixture to form the bimetallic structure, the third precursor comprising a Group 8-10 metal, the bimetallic structure comprising copper (Cu), the Group 8-10 metal (M), phosphorous (P), and nitrogen (N), the bimetallic structure having the formula $(Cu)_a(M)_b(P)_c(N)_d$, wherein a molar ratio of a:b is from about 1:99 to about 99:1, and a molar ratio of a:(c+d) is from about 500:1 to about 1:1.

10 Claims, 10 Drawing Sheets
(1 of 10 Drawing Sheet(s) Filed in Color)

(56) References Cited

OTHER PUBLICATIONS

Fu, G. T.; Liu, C.; Zhang, Q.; Chen Y.; Tang, Y. W., Polyhedral Palladium-Silver Alloy Nanocrystals as Highly Active and Stable Electrocatalysts for the Formic Acid Oxidation Reaction, Scientific Reports, 2015, 5:13703, doi: 10.1038/srep13703.

L. L. Liu, X. Zhou, L. Liu, S. Jiang, Y. Li, L. Guo, S. Yan, X. Tai, "Heterogenerous bimetallic Cu—Ni nanoparticles-supported catalysts in the selective oxidation of benzyl alcohol to benzadehyde", Catalysis, 2019, 9, 538.

Wasiak, T.; Hannula, P. M.; Lundstrom, M.; Janas, D., Transformation of industrial wastewater into copper-nickel nanowire composites: straightforward recycling of heavy metals to obtain products of high added value, Scientific Reports, 2020, 10:19190, doi: 10.1038/s41598-020-67374-x.

C. Li, X. Chen, L. Zhang, S. Yan, A. Sharma, B. Zhao, A. Kumbhar, G. Zhou, J. Fang, of Core@Shell Cu—Ni@Pt—Cu Nano-Octahedra and Their Improved MOR Activity, Angewandte Chemie International Edition, 2021, doi.org/10.1002/anie.202014144.

K. Kodama, T. Nagai, A. Kuwaki, R. Jinnouchi, Y. Morimoto, "Challenges in applying highly active Pt-based hanostructured catalysts for oxygen reduction reactions to fuel cell vehicles", Nat. Nanotechnology, 2021, 16, 140-147.

X. X. Wang, M. T. Swihart, G. Wu, "Achievements, challenges and perspectives on cathode catalysts in proton exchange membrane fuel cells for transportation", Nat. Catalysis., 2019, 2, 578-589.

P. D. Luna, C. Hahn, D. Higgins, S. A. Jaffer, T. F. Jaramillo, E. H. Sargent, "What would it take for renewably powered electrosynthesis to displace petrochemical processes" Science, 2019, 364, eaav3506.

Q. Shao, P. Wang, T. Zhu, X. Huang, "Low dimensional platinum-based bimetallic nanostructures for advanced catalysis", Acc. Chem. Res., 2019, 52, 3383-3396.

M. Gong, D. Wang, C. Chen, B. Hwang, H. Dai, "A mini review on nickel-based electrocatalysts for alkaline hydrogen evolution reaction", Nano Research, 2016, 9, 28-46.

L.A. King M. A. Hubert, C. Capuano, J. Manco, Ne. Danilovic, E. Valle, T. R. Hellstern, K. Ayers T. F. Jaramillo, "A non-precious metal hydrogen catalyst in a commercial polymer electrolyte membrane electrolyser" Nat. Nanotechnology, 2019, 14, 1071-1074.

Z. Quan, Y. Wang, J. Fang, "High-index faceted noble metal nanocrystals", Accounts Chemical Research, 2013, 46, 191-202.

J. W. Hong, Y. Kim, Y. Kwon, S. W. Han, "Noble-metal nanocrystals with controlled facets for electrocatalysis", Chem Asian J., 2016, 11, 2224-2239.

\* cited by examiner

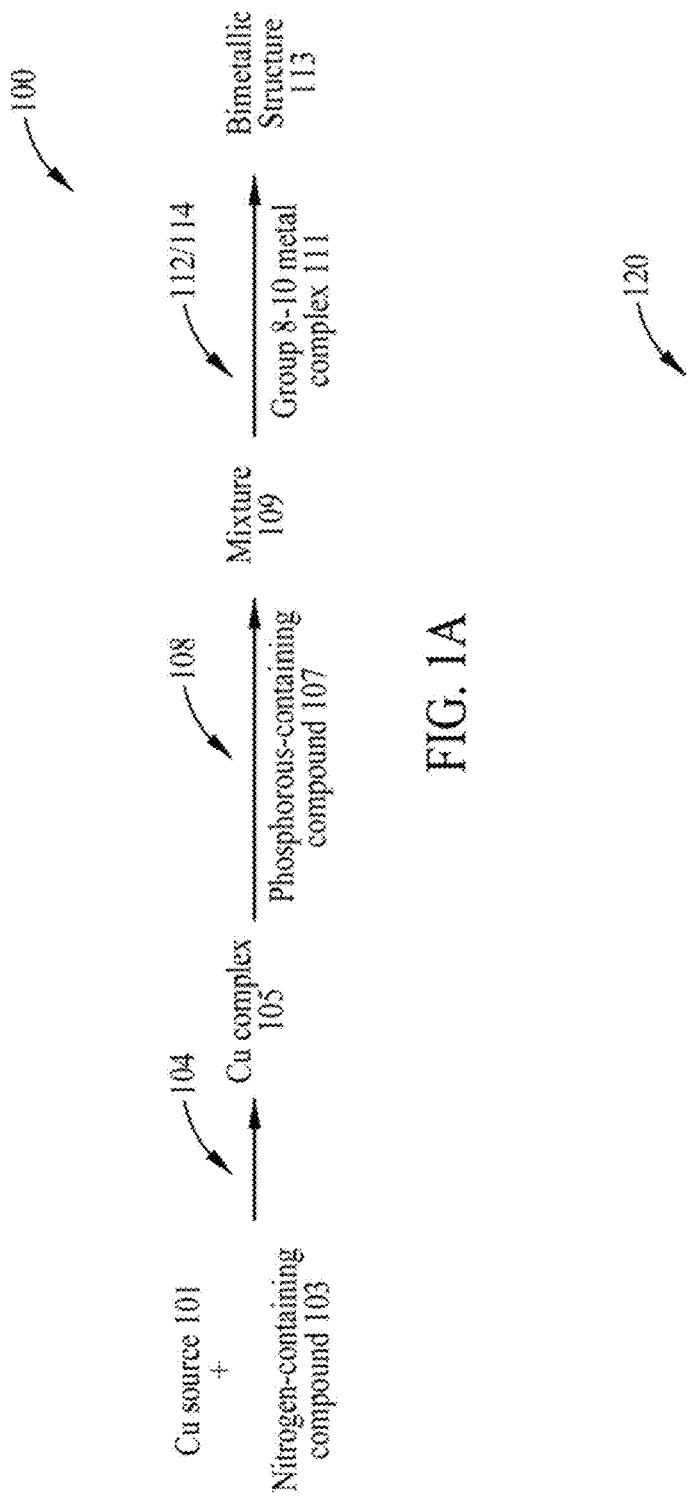
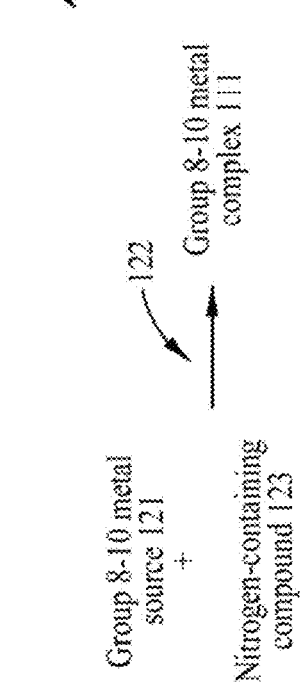
FIG. 1A
FIG. 1B

COPPER-CONTAINING BIMETALLIC STRUCTURES, SYNTHESES THEREOF, AND USES THEREOF

FIELD

Aspects of the present disclosure generally relate to copper-containing bimetallic structures, to processes for producing the copper-containing bimetallic structures, and to uses of the bimetallic structures as, e.g., catalysts.

BACKGROUND

Various metal catalysts are utilized in fuel cells to enhance the conversion of raw materials to energy via direct electrochemical oxygen reduction reactions and hydrogen evolution reactions. These metal catalysts are typically in the form of a metal nanostructure with high-index facets. The crystallographic properties of such facets are closely associated with the shape of the catalyst particle, which then influence the electrocatalytic function of the catalyst. Platinum is the most commonly used and effective catalyst for fuel cells, and specifically, for proton exchange membrane fuel cells (PEMFCs). However, the high cost of platinum limits its widespread adoption in fuel cells, PEMFCs, and other areas where large amounts of platinum are needed.

Efforts have been made to replace expensive, or relatively rare, metals with abundant metals such as copper and nickel. However, the use of Cu—Ni nanoparticles in electrochemical oxygen reduction reactions, hydrogen evolution reactions, PEMFC devices, and other catalyst applications, remains a challenge because of, e.g., their low efficiency. As such, catalysts fabricated from relatively abundant metals do not represent a viable replacement for platinum-based catalysts.

There is a need for new bimetallic structures that can be used as, e.g., high performing alternatives to existing catalysts used in energy technology.

SUMMARY

Aspects of the present disclosure generally relate to copper-containing bimetallic structures, to processes for producing the bimetallic structures, and to uses of the bimetallic structures as, e.g., catalysts.

In an aspect, a process for forming a bimetallic structure is provided. The process includes forming a mixture comprising a first precursor and a second precursor, the first precursor comprising copper, the second precursor comprising a phosphine. The process further includes introducing a third precursor with the mixture to form the bimetallic structure, the third precursor comprising a Group 8-10 metal, the bimetallic structure comprising copper (Cu), the Group 8-10 metal (M), phosphorous (P), and nitrogen (N), the bimetallic structure having the formula $(Cu)_a(M)_b(P)_c(N)_d$, wherein a molar ratio of a:b is from about 1:99 to about 99:1, and a molar ratio of a:(c+d) is from about 500:1 to about 1:1.

In another aspect, a bimetallic structure is provided. The bimetallic structure includes a core comprising copper and a Group 8-10 metal, the core having a greater amount of copper than the Group 8-10 metal, and a shell comprising copper and the Group 8-10 metal, the shell having a greater amount of the Group 8-10 metal than copper. The bimetallic structure further includes one or more ligands bonded to the copper of the core, the copper of the shell, the Group 8-10 metal of the core, the Group 8-10 metal of the shell, or combinations thereof, wherein at least one of the one or more ligands comprises a nitrogen-containing ligand, and at least one of the one or more ligands comprises a phosphorous-containing ligand.

In another aspect, a process for forming a conversion product is provided. The process includes introducing a reactant to a bimetallic structure. The process further includes forming the conversion product, the bimetallic structure comprising copper (Cu), a Group 8-10 metal (M), phosphorous (P), and nitrogen (N), the bimetallic structure having the formula $(Cu)_a(M)_b(P)_c(N)_d$, wherein: a molar ratio of a:b is from about 1:99 to about 99:1; and a molar ratio of c:d is from about 1:100 to about 1:20.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only exemplary aspects and are therefore not to be considered limiting of its scope, for the disclosure may admit to other equally effective aspects.

FIG. 1A is an example reaction diagram for forming a copper-containing bimetallic structure according to at least one aspect of the present disclosure.

FIG. 1B is an example reaction diagram for forming a Group 8-10 metal complex according to at least one aspect of the present disclosure.

To facilitate understanding, identical reference numerals have been used, where possible, to designate identical elements that are common to the figures. It is contemplated that elements and features of one example may be beneficially incorporated in other examples without further recitation.

DETAILED DESCRIPTION

Figure 2A:
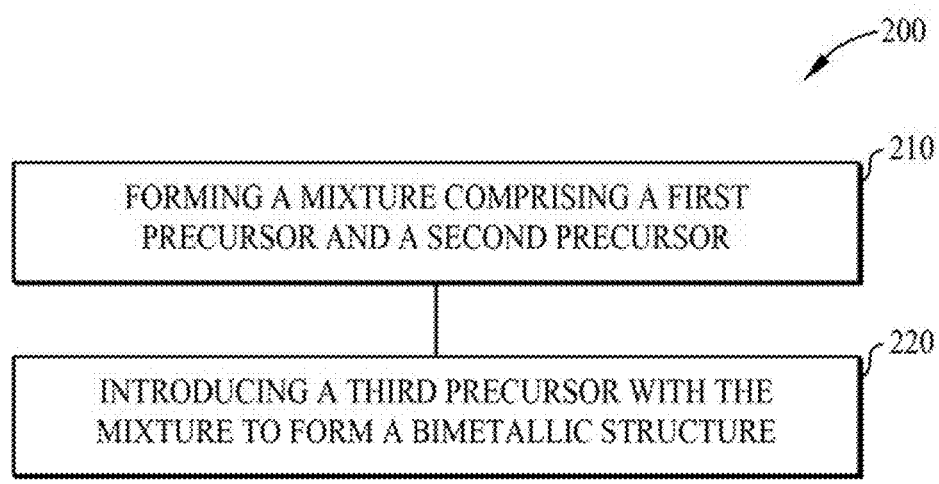
FIG. 2A is a flowchart showing selected operations of an example process for producing a copper-containing bimetallic structure according to at least one aspect of the present disclosure.

Aspects of the present disclosure generally relate to copper-containing bimetallic structures, to processes for producing the copper-containing bimetallic structures, and to uses of the copper-containing bimetallic structures as, e.g., catalysts. The inventors have found new copper-containing bimetallic structures that include copper and a Group 8-10 metal of the periodic table of the elements. These bimetallic structures can be in the form of metal polyhedral nanostructures such as nanocrystals and nanoparticles where the copper and the Group 8-10 metal can be in an alloy phase.

The inventors have also found processes for forming copper-containing bimetallic structures. Briefly, and in some examples, the process includes reacting a copper-containing compound, a phosphorous-containing compound, and a Group 8-10 metal-containing compound under conditions effective to form the copper-containing bimetallic structures. The processes described herein enable control over, e.g., the morphology of the bimetallic structures, its structure, the number of active surface sites, among other chemical and physical characteristics. The copper-containing bimetallic structures can be utilized as a catalyst for, e.g., electrochemical oxygen reduction reactions and hydrogen evolution reactions. In such applications, the copper-containing bimetallic structures can be integrated into a portion of a PEMFC device.

Copper-Containing Bimetallic Structures

The present disclosure generally relates to copper-containing bimetallic structures. The copper-containing bimetallic structures can be in the form of nanoparticles, microparticles, macroparticles, nanocrystals, microcrystals, and/or macrocrystals. However, other structures are contemplated. The bimetallic structures can be in the form of a composition. The bimetallic structure can be in the form homogeneous structures such as an alloy structure, as well as heterogeneous structures such as a core-shell structure, and/or a heterostructure. Other structures include intermetallic structures and partial alloys. Each of these different types of bimetallic structures can be different physical performance capabilities.

The copper-containing bimetallic structure includes copper (Cu) and one or more elements (e.g., metals) from Group 8 to Group 10 of the periodic table of elements, such as iron (Fe), ruthenium (Ru), osmium (Os), cobalt (Co), rhodium (Rh), iridium (Ir), nickel (Ni), palladium (Pd), platinum (Pt), or combinations thereof, such as Fe, Co, Ni, or combinations thereof. The copper-containing bimetallic structures can also include phosphorous atoms, nitrogen atoms, or both. The phosphorous atoms and/or nitrogen atoms can be in the form of ligand(s) and/or chelating group(s) bound to copper, the Group 8-10 metal, or both the copper and the Group 8-10 metal. The ligand(s) and/or chelating group(s), when present, can be in the form of neutral species, monodentate species, bidentate species, and/or polydentate species.

In some aspects, the copper-containing bimetallic structure has the formula:

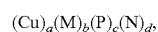

wherein: Cu is copper, M is the Group 8-10 metal, P is phosphorous, N is nitrogen, a is the amount of Cu, b is the amount of M, c is the amount of phosphorous, and d is the amount of nitrogen.

A molar ratio of a:b can be from about 1:99 to about 99:1, such as from about 10:90 to about 90:10, such as from about 20:80 to about 80:20, such as from about 30:70 to about 70:30, such as from about 40:60 to about 60:40, such as from about 45:55 to about 55:45, such as from about 48:52 to about 50:50. In some aspects, a molar ratio of a:b can be from about 20:1 to about 1:20, such as from about 10:1 to about 1:10, such as from about 5:1 to about 1:5, such as from about 3:1 to about 1:3, such as from about 2:1 to about 1:2. In at least one aspect, a molar ratio of a:b is from about 1:99 to about 20:1, such as from about 5:95 to about 10:1, such as from about 10:90 to about 1:1, such as from about 30:70 to about 40:60.

A molar ratio of a:c can be from about 1000:1 to about 100:1, such as from about 900:1 to about 200:1, such as from about 800:1 to about 300:1, such as from about 700:1 to about 400:1, such as from about 600:1 to about 500:1. In at least one aspect, a molar ratio of a:c is from about 50:1 to 1:1, such as from about 20:1 to about 3:1, such as from about 10:1 to about 5:1.

A molar ratio of a:d can be from about 500:1 to about 50:1, such as from about 450:1 to about 100:1, such as from about 400:1 to about 150:1, such as from about 350:1 to about 200:1, such as from about 300:1 to about 250:1. In at least one aspect, a molar ratio of a:d is from about 40:1 to 1:1, such as from about 20:1 to about 3:1, such as from about 10:1 to about 5:1.

A molar ratio of b:c can be from about 500:1 to about 50:1, such as from about 450:1 to about 100:1, such as from about 400:1 to about 150:1, such as from about 350:1 to about 200:1, such as from about 300:1 to about 250:1. In at least one aspect, a molar ratio of b:c is from about 40:1 to 1:1, such as from about 20:1 to about 3:1, such as from about 10:1 to about 5:1.

A molar ratio of b:d can be from about 150:1 to about 10:1, such as from about 125:1 to about 25:1, such as from about 100:1 to about 40:1, such as from about 90:1 to about 50:1, such as from about 80:1 to about 60:1, such as from about 75:1 to about 65:1. In at least one aspect, a molar ratio of b:d is from about 10:1 to 1:1, such as from about 8:1 to about 3:1, such as from about 7:1 to about 5:1.

A molar ratio of c:d can be from about 1:100 to about 1:20, such as from about 1:80 to about 1:30, from about 1:60 to about 1:45. In at least one aspect, a molar ratio of b:d is from about 1:20 to about 1:1, such as from about 1:10 to about 1:3, from about 1:6 to about 1:5.

A molar ratio of a:(c+d) can be from about 500:1 to about 1:1, such as from about 400:1 to about 20:1, such as from about 200:1 to about 50:1, such as from about 150:1 to about 80:1, such as from about 130:1 to about 90:1, such as from about 120:1 to about 95:1, such as from about 110:1 to about 105:1.

For the copper-containing bimetallic structures, the molar ratios of a:b, a:c, a:d, b:c, b:d, c:d, and a:(c+d) are determined by transmission electron microscopy of the copper-containing bimetallic structure being analyzed.

For processes for producing a copper-containing bimetallic structure, the molar ratio of a:b, a:c, a:d, b:c, b:d, c:d, a:(c+d) of the copper-containing bimetallic structure are determined based on the starting material molar ratio used for the synthesis.

The phosphorous of the bimetallic structure originates from a phosphorous-containing compound utilized for the synthesis of the copper-containing bimetallic structure. Such phosphorous-containing compounds include phosphines having the formula

PR$^1$R$^2$R$^3$, wherein:
each of R$^1$, R$^2$, and R$^3$ is independently selected from hydrogen, unsubstituted hydrocarbyl, substituted hydrocarbyl, unsubstituted aryl, substituted aryl, or two or more of R$^1$, R$^2$ and/or R$^3$ may join together to form a substituted or unsubstituted, cyclic or polycyclic ring structure. Unsubstituted hydrocarbyl includes $C_1$-$C_{100}$ unsubstituted hydrocarbyl, such as $C_1$-$C_{40}$ unsubstituted hydrocarbyl, such as $C_1$-$C_{20}$ unsubstituted hydrocarbyl, such as $C_1$-$C_{10}$ unsubstituted hydrocarbyl, such as $C_1$-$C_6$ unsubstituted hydrocarbyl. Substituted hydrocarbyl includes $C_1$-$C_{100}$ substituted hydrocarbyl, such as $C_1$-$C_{40}$ substituted hydrocarbyl, such as $C_1$-$C_{20}$ substituted hydrocarbyl, such as $C_1$-$C_{10}$ substituted hydrocarbyl, such as $C_1$-$C_6$ substituted hydrocarbyl. Unsubstituted aryl includes $C_4$-$C_{100}$ unsubstituted aryl, such as $C_4$-$C_{40}$ unsubstituted aryl, such as $C_4$-$C_{20}$ unsubstituted aryl, such as $C_4$-$C_{10}$ unsubstituted aryl. Substituted aryl includes $C_4$-$C_{100}$ substituted aryl, such as a $C_4$-$C_{40}$ substituted aryl, such as $C_4$-$C_{20}$ substituted aryl, such as $C_4$-$C_{10}$.

Each of R$^1$, R$^2$, and R$^3$ is, independently, saturated or unsaturated, linear or branched, cyclic or acyclic, aromatic or non-aromatic. When one or more of R$^1$, R$^2$, and/or R$^3$ is joined together, the formed structure may be substituted or unsubstituted, fully saturated, partially unsaturated, or fully unsaturated, aromatic or non-aromatic, cyclic or polycyclic.

In at least one aspect, one or more of R$^1$, R$^2$, or R$^3$ is, independently, methyl, ethyl, n-propyl, isopropyl, n-butyl, isobutyl, tert-butyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, or sec-decyl, cyclopentyl, cyclohexyl, phenyl, benzyl, isomers thereof, or derivatives thereof.

In some aspects, and when one or more of R$^1$, R$^2$, or R$^3$ is, independently, a substituted hydrocarbyl or a substituted aryl, at least one carbon of the substituted hydrocarbyl or the substituted aryl has been substituted with at least one heteroatom or heteroatom-containing group, such as one or more elements from Group 13-17 of the periodic table of the elements, such as halogen (F, Cl, Br, or I), O, N, Se, Te, P, As, Sb, S, B, Si, Ge, Sn, Pb, and the like, such as NR*$_2$, OR* (e.g., OH or O$_2$H), SeR*, TeR*, PR*$_2$, AsR*$_2$, SbR*$_2$, SR*, SOX (where x=2 or 3), BR*$_2$, SiR*$_3$, GeR*$_3$, SnR*$_3$, PbR*$_3$, and the like or where at least one heteroatom has been inserted within the hydrocarbyl radical or aryl radical such as one or more of halogen (Cl, Br, I, F), O, N, S, Se, Te, NR*, PR*, AsR*, SbR*, BR*, SiR*$_2$, GeR*$_2$, SnR*$_2$, PbR*$_2$, and the like, where R* is, independently, hydrogen, hydrocarbyl (e.g., $C_1$-$C_{10}$), or two or more R* may join together to form a substituted or unsubstituted completely saturated, partially unsaturated, fully unsaturated, or aromatic cyclic or polycyclic ring structure.

Illustrative, but non-limiting, examples of phosphorous-containing compounds include alkylphosphines and/or arylphosphines such as trimethylphosphine, triethylphosphine, tripropylphosphine, tributylphosphine, tripentylphosphine, trihexylphosphine, trioctylphosphine, tricyclohexylphosphine, di ethylphosphine, dibutylphosphine, diphenylphosphine, dimethylethylphosphine, triphenylphosphine, isomers thereof, derivatives thereof, and combinations thereof.

The nitrogen of the bimetallic structure originates from a nitrogen-containing compound utilized for the synthesis of the copper-containing bimetallic structure. Such nitrogen-containing compounds include, e.g., primary amines, secondary amines, tertiary amines, or combinations thereof. The nitrogen-containing compounds can include an unsubstituted hydrocarbyl or a substituted hydrocarbyl (as described herein) bonded to the nitrogen of the nitrogen-containing compound, where the unsubstituted hydrocarbyl or substituted hydrocarbyl can be saturated or unsaturated, linear or branched, cyclic or acyclic, aromatic or non-aromatic. The nitrogen-containing compound can be an alkylamine. Illustrative, but non-limiting, examples of nitrogen-containing compounds include oleylamine (OLA), octadecylamine (ODA), hexadecylamine (HDA), dodecylamine (DDA), tetradecylamine (TDA), isomers thereof, derivatives thereof, or combinations thereof.

In some aspects, the copper-containing bimetallic structure can have an average particle size from about 5 nm to about 2000 μm, such as from about from 50 nm to 200 μm, such as from about from 50 nm to 20 μm, such as from about from 500 nm to 2 μm. For polyhedral particles, the average particle size is an equivalent edge length as measured by TEM. In some examples, the average particle size can be about 5 nm or more, such as from about 10 nm to about 100 nm, such as from about 15 nm to about 95 nm, 20 nm to about 90 nm, such as from about 25 nm to about 85 nm, such as from about 30 nm to about 80 nm, such as from about 35 nm to about 75 nm, such as from about 40 nm to about 70 nm, such as from about 45 nm to about 65 nm, such as from about 50 nm to about 60 nm, such as from about 50 nm to about 60 nm, such as from about 50 nm to about 55 nm or from about 55 nm to about 60 nm. In some examples, the average particle size can be from about 10 nm to about 400 nm, such as from about 25 nm to about 375 nm, such as from about 50 nm to about 350 nm, such as from about 75 nm to about 325 nm, such as from about 100 nm to about 300 nm, such as from about 125 nm to about 275 nm, such as from about 150 nm to about 250 nm, such as from about 175 nm to about 225 nm, such as from about 175 nm to about 200 nm or from about 200 nm to about 225 nm.

The copper-containing bimetallic structure can be in the form of a core-shell structure where, e.g., both copper and the Group 8-10 metal are in both the core and the shell. In some examples, the copper can be located mainly in the core (or center) of the bimetallic structure (e.g., particle or crystal) and the Group 8-10 metal can be mainly distributed around the edge region (or in the shell) of the core-shell structure as determined by elemental mapping using energy dispersive spectroscopy.

As an example, a particle, e.g., a metal particle, can include a core and a shell. The core can include copper and a Group 8-10 metal, where the amount of copper in the core can be more than, equal to, or less than the amount of the Group 8-10 metal in the core. The shell can include copper and the Group 8-10 metal, where the amount of the Group 8-10 metal in the core can be more than, equal to, or less than the amount of copper in the shell. The amounts of copper and/or Group 8-10 metal in the core or shell can be adjusted by, e.g., changing the reaction temperature. Similarly, the amounts of copper and/or Group 8-10 metal in the core-shell structure can be adjusted by, e.g., changing the reaction temperature. The particle can further include one or one or more ligands bonded, physically and/or chemically, to the copper of the core, the copper of the shell, the Group 8-10 metal of the core, the Group 8-10 metal of the shell, or combinations thereof. Such ligands can include nitrogen, phosphorous, or both. Illustrative, but non-limiting, examples of such ligands include, or are derived from, the phosphorous-containing compounds and nitrogen-containing compounds described above.

The copper-containing bimetallic structures can include particles and/or crystals that have various three-dimensional shapes (e.g., polyhedra) with a desired number of faces. The number of faces can be about 4 faces or more, such as from about 4 faces to about 50 faces, such as from about 8 faces to about 40 faces, such as from about 12 faces to about 30 faces, such as from about 18 faces to about 20 faces. The number of faces can be in multiples of two starting with about 4 faces, and/or in multiples of five starting with about 5 faces. The number of faces can be one or more of 4, 8, 12, 15, 18, 20 24, 30, 40, or 50 faces.

In some aspects, the copper-containing bimetallic structure has an X-ray diffraction pattern showing peaks at $\{111\}$, $\{200\}$, $\{220\}$, and/or $\{311\}$.

Processes for Producing Copper-Containing Bimetallic Structures

The present disclosure also relates to processes for forming copper-containing bimetallic structures such as those described above. FIGS. 1A and 1B show reaction diagrams 100 and 120, respectively, illustrating selected operations for forming a copper-containing bimetallic structures, such as those copper-containing bimetallic structures described above. FIG. 2A is a flowchart showing selected operations of an example process 200 for producing the copper-containing bimetallic structure according to at least one aspect of the present disclosure.

The process 200 includes forming a mixture 109, under first conditions, comprising a first precursor and a second precursor at operation 210. The first precursor includes copper and the second precursor includes a phosphorous-containing compound. The copper of the first precursor can be in the form of a copper complex 105.

The copper complex 105 of the first precursor can be made by, e.g., introducing a copper source 101 with a nitrogen-containing compound 103 under conditions 104 effective to form the copper complex 105. The copper complex 105 can be a copper amine. The copper source 101 can include one or more ligands such as halide (e.g., $I^-$, $Br^-$, $Cl^-$, or $F^-$), acetylacetonate ($O_2C_5H_7^-$), hydride ($H^-$), $SCN^-$, $NO_2^-$, $NO_3^-$, $N_3^-$, $OH^-$, oxalate ($C_2O_4^{2-}$), $H_2O$, acetate ($CH_3COO^-$), $O_2^-$, $CN^-$, $OCN^-$, $OCN^-$, $CNO^-$, $NH_2^-$, $NH^{2-}$, $NC^-$, $NCS^-$, $N(CN)_2^-$, pyridine (py), ethylenediamine (en), 2,2'-bipyridine (bipy), $PPh_3$, or combinations thereof. In some aspects, the copper source 101 includes copper acetates, copper halides, copper nitrates, and/or other copper species. The nitrogen-containing compound 103 can be those described above. Illustrative, but non-limiting, examples of the nitrogen-containing compound 103 include OLA, ODA, HDA, DDA, TDA, or combinations thereof. The nitrogen-containing compound 103 can be utilized as a solvent. When desired, a solvent such as octadecene, phenyl ether, benzyl ether, or combinations thereof can additionally, or alternatively, be used. In some examples, the molar ratio of copper source to nitrogen-containing compound is from about 1:1000 to about 1:1, such as from about 1:500 to about 1:1, such as from about 1:100 to about 1:1, such as from about 1:50 to about 1:1 based on the starting material molar ratio used for the reaction. In some aspects, the molar ratio of copper source to nitrogen-containing compound is from about 1:20 to about 1:1, such as from about 1:10 to about 1:1, such as from about 1:4 to about 1:1, such as from about 1:2 to about 1:1 based on the starting material molar ratio used for the reaction.

Conditions 104 effective to form the copper complex 105 (e.g., the copper amine) can include a reaction temperature and a reaction time. The reaction temperature to form the copper complex 105 can be greater than about 40° C., such as greater than about 60° C., such as greater than about 80° C., such as from about 100° C. to about 320° C., such as from about 110° C. to about 310° C., such as from about 120° C. to about 300° C., such as from about 130° C. to about 290° C., such as from about 140° C. to about 280° C., such as from about 150° C. to about 270° C., such as from about 160° C. to about 260° C., such as from about 170° C. to about 250° C., such as from about 180° C. to about 240°

C., such as from about 190° C. to about 230° C., such as from about 200° C. to about 220° C. In some aspects, the reaction temperature to form the copper complex 105 can be from about 150° C. to about 250° C. or from about 180° C. to about 240° C. Higher or lower temperatures can be used when appropriate. The reaction time to form the copper complex 105 can be about 1 minute (min) or more or about 24 h or less, such as from about 1 min to about 12 h, such as from about 5 min to about 6 hours (h), such as from about 10 min to about 5.5 h, such as from about 15 min to about 5 h, such as from about 30 min to about 4 h, such as from about 45 min to about 3 h, such as from about 1 h to about 2 h. The reaction time to form the copper complex 105 can be more or less depending on, e.g., the level of conversion desired. Any reasonable pressure can be used during formation of the copper complex 105.

Conditions 104 effective to form the copper complex 105 (e.g., the copper amine) can include stirring, mixing, and/or agitation. Conditions 104 effective to form the copper complex 105 can optionally include utilizing a non-reactive gas, such as $N_2$ and/or Ar. For example, a mixture of the copper source 101 and the nitrogen-containing compound 103 can be placed under these or other non-reactive gases to, e.g., degas various components or otherwise remove oxygen from the reaction mixture.

In some aspects, the copper complex 105 can be kept in the form of a stock solution/suspension for use in operation 210. In other aspects, the reaction product comprising the copper complex 105 can be subjected to filtration, separation, cleaning, quenching, washing, purification, and/or other suitable processes to remove undesired components and isolate the copper complex 105 from the other components of the reaction mixture. For example, the reaction product comprising the copper complex 105 (which may be in the form of particles) can be centrifuged to separate the copper complex 105 from the mixture. Additionally, or alternatively, the copper complex 105 can be washed with polar solvent(s), such as water, acetone, ethanol, methanol, or combinations thereof, and/or non-polar solvent(s), such as hexane, pentane, toluene, or combinations thereof. Other solvents for washing can include ether solvents such as diethyl ether and tetrahydrofuran; chlorocarbon solvents such as dichloromethane and chloroform; as well as ethyl acetate, dimethylformamide, acetonitrile, benzene, isopropanol, n-butanol, n-propanol. Mixtures of two or more of these solvents, in suitable proportions, can be utilized for washing, purifying, or otherwise separating the copper complex 105 from other components in the reaction mixture. As an example, a solvent or a mixture of solvents can be added to the copper complex 105 and the resultant mixture centrifuged. The supernatant can be discarded and the remaining pellet can be dispersed in a suitable solvent or mixture of solvents. The resultant pellet and solvent(s) can then be centrifuged to obtain the copper complex 105. In these and other aspects, the pellet comprising the copper complex 105 can be re-solubilized or re-suspended in a nitrogen-containing compound such as those described above.

The second precursor of operation 210 includes a phosphorous-containing compound 107. The phosphorous-containing compound 107 can be one or more of those described above.

The first conditions of operation 210 can include an operating temperature and a duration of time. In FIG. 1A, the first conditions are designated by numeral 108. The operating temperature of operation 210 can be set to about 400° C. or less, such as from about 50° C. to about 400° C., such as from about 75° C. to about 375° C., such as from about 100° C. to about 350° C., such as from about 125° C. to about 325° C., such as from about 150° C. to about 300° C., such as from about 175° C. to about 275° C., such as from about 200° C. to about 250° C., such as from about such as from about 200° C. to about 225° C. In some aspects, the operating temperature of operation 210 can be set to a temperature of about 100° C. to about 150° C. or from about 180° C. to about 320° C. Higher or lower temperatures can be used when appropriate. The time for forming the mixture (e.g., the first conditions 108) of operation 210 can be about 1 min or more or about 24 h or less, such as from about 5 min to about 6 h, such as from about 10 min to about 1 h, though greater or lesser periods of time are contemplated. Operation 210 can include stirring, mixing, and/or agitating the mixture to ensure, e.g., homogeneity of the mixture. Operation 210 can be performed using a non-reactive gas (e.g., $N_2$ and/or Ar) to, e.g., remove or substantially remove oxygen from the mixing environment. Suitable operating pressures can be utilized for operation 210.

Additionally, the molar ratio of the first precursor (e.g., the copper complex 105) to second precursor (e.g., the phosphorous-containing compound 107) can be adjusted as desired. In some examples, the molar ratio of the copper complex 105 to the phosphorous-containing compound 107 is from about 50:1 to about 1:100, such as from about 20:1 to about 1:50, such as from about 10:1 to about 1:10 based on the starting material molar ratio used for the reaction. In some aspects, the molar ratio of the copper complex 105 to the phosphorous-containing compound 107 is from about 5:1 to about 1:5, such as from about 3:1 to about 1:3, such as from about 1:1 to about 1:2 based on the starting material molar ratio used for the reaction.

In some aspects, and prior to introducing the first precursor with the second precursor, the second precursor can be mixed with a solvent. The solvent can be, or include, a nitrogen-containing compound, such as those described above. Additionally, or alternatively, other suitable solvents can be used. The solvent(s) and the second precursor, e.g., the phosphorous-containing compound 107, can be heated under a non-reactive gas (e.g., $N_2$ and/or Ar) at a temperature of about 50° C. or more to about 400° C. or less, such as from about 75° C. to about 375° C., such as from about 100° C. to about 350° C., such as from about 125° C. to about 325° C., such as from about 150° C. to about 300° C., such as from about 175° C. to about 275° C., such as from about 200° C. to about 250° C., such as from about such as from about 200° C. to about 225° C., for a suitable time such as about 24 h or less, such as about 12 h or less, such as about 5 h or less, such as about 1 h or less, such as about 30 min or less, such as about 10 min or less and under suitable pressures. In these and other aspects, the first precursor is then added to the second precursor and optional solvent. The resulting mixture can then be cooled to those temperatures of the first conditions described above, such as from about 50° C. to about 400° C., such as from about 75° C. to about 375° C., such as from about 100° C. to about 350° C., such as from about 125° C. to about 325° C., such as from about 150° C. to about 300° C., such as from about 175° C. to about 275° C., such as from about 200° C. to about 250° C., such as from about such as from about 200° C. to about 225° C. for a suitable time (described above), under suitable pressures, and optionally under a non-reactive gas (e.g., $N_2$ and/or Ar).

The process 200 further includes introducing, under second conditions, a third precursor with the mixture 109 to form a bimetallic structure 113 at operation 220. The third precursor includes a Group 8-10 metal complex 111. The bimetallic structure 113 formed in operation 220 be a copper-containing bimetallic structure having the formula $(Cu)_a(M)_b(P)_c(N)_d$ as described above. Chemical and physical properties of the bimetallic structure 113 are also described above. In FIG. 1A, the second conditions are designated by numeral 112/114.

For operation 220, amounts of the Group 8-10 metal complex 111 of the third precursor can be adjusted relative to one or more components of the mixture formed in operation 210, e.g., the copper complex 105 and the phosphorous-containing compound 107. For example, the molar ratio of Group 8-10 metal complex 111 to the phosphorous-containing compound 107 can be from about 1:500 to about 1:50, such as from about 1:250 to about 1:70, such as from about 1:120 to about 1:100 based on the starting material molar ratio used for the reaction. In some aspects, the molar ratio of Group 8-10 metal complex 111 to the phosphorous-containing compound 107 can be from about 1:50 to about 1:1, such as from about 1:20 to about 1:5, such as from about 1:10 to about 1:8 based on the starting material molar ratio used for the reaction.

Additionally, or alternatively, the molar ratio of the Group 8-10 metal complex 111 to the copper complex 105 can be from about 100:1 to about 1:10, such as from about 80:1 to about 1:20, such as from about 50:1 to about 1:30 based on the starting material molar ratio used for the reaction. In some aspects, the molar ratio of the Group 8-10 metal complex 111 to the copper complex 105 can be from about 1:1 to about 1:10, such as from about 1:2 to about 1:7, such as from about 1:3 to about 1:4 based on the starting material molar ratio used for the reaction.

When desired, a solvent such as octadecene, benzyl ether, phenyl ether, or combinations thereof can be used for operation 220. In some aspects, the third precursor comprising the Group 8-10 metal complex 111 is introduced to the mixture 109 as a solution/suspension in a solvent. For example, a nitrogen-containing compound, such as those described above, can be utilized as a solvent.

As shown in FIG. 1B, the Group 8-10 metal complex 111 of the third precursor can be formed by introducing a Group 8-10 metal source 121 with a nitrogen-containing compound 123 under conditions 122 effective to form the Group 8-10 metal complex 111. The nitrogen-containing compound 123 can be the same or different than the nitrogen-containing compound 103. The Group 8-10 metal source 121 includes a Group 8-10 metal of the periodic table of the elements, such as Fe, Ru, Os, Co, Rh, Ir, Ni, Pd, Pt, or combinations thereof, such as Fe, Co, Ni, or combinations thereof. The Group 8-10 metal source 121 can also include one or more ligands such as halide (e.g., $I^-$, $Br^-$, $Cl^-$, or $F^-$), acetylacetonate ($O_2C_5H_7^-$), hydride ($H^-$), $SCN^-$, $NO_2$, $NO_3^-$, $N_3^-$, $OH^-$, oxalate ($C_2O_4^{2-}$), $H_2O$, acetate ($CH_3COO^-$), $O_2^-$, $CN^-$, $OCN^-$, $OCN^-$, $CNO^-$, $NH_2^-$, $NH^{2-}$, $NC^-$, $NCS^-$, $N(CN)_2^-$, pyridine (py), ethylenediamine (en), 2,2'-bipyridine (bipy), $PPh_3$, or combinations thereof. In some aspects, the Group 8-10 metal source 121 includes metal acetates, metal acetalacetonates, metal halides, metal nitrates, and/or other Group 8-10 metal species. Illustrative, but non-limiting, examples of the Group 8-10 metal source 121 include nickel(II) acetylacetonate, nickel(II) nitrate, nickel(II) chloride, cobalt(II) acetylacetonate, iron(II) acetylacetonate, and combinations thereof.

Conditions 122 effective to form the Group 8-10 metal complex 111 (e.g., the Group 8-10 metal amine) of the third precursor can include similar conditions for forming the copper complex 105 described above with respect to conditions 104. For example, the Group 8-10 metal source 121 and the nitrogen-containing compound 123 can be mixed, stirred, and/or agitated at a temperature greater than about 40° C., such as greater than about 60° C., such as from about 80° C. to about 340° C., such as from about 90° C. to about 330° C., such as from about 100° C. to about 320° C., such as from about 110° C. to about 310° C., such as from about 120° C. to about 300° C., such as from about 130° C. to about 290° C., such as from about 140° C. to about 280° C., such as from about 150° C. to about 270° C., such as from about 160° C. to about 260° C., such as from about 170° C. to about 250° C., such as from about 180° C. to about 240° C., such as from about 190° C. to about 230° C., such as from about 200° C. to about 220° C. In some aspects, the reaction temperature to form the Group 8-10 metal complex 111 can be from about 150° C. to about 250° C. or from about 180° C. to about 240° C. Higher or lower temperatures can be used when appropriate. The reaction time to form the Group 8-10 metal complex 111 can be about 1 min or more or about 24 h or less, such as from about 5 min to about 6 h, such as from about 10 min to about 5.5 h, such as from about 15 min to about 5 h, such as from about 30 min to about 4 h, such as from about 45 min to about 3 h, such as from about 1 h to about 2 h. The reaction time to form the Group 8-10 metal complex 111 can be more or less depending on, e.g., the level of conversion desired. Any reasonable operating pressure can be used during formation of the Group 8-10 metal complex 111. Conditions 122 effective to the Group 8-10 metal complex 111 can optionally include utilizing a non-reactive gas, e.g., $N_2$ and/or Ar). For example, a mixture of the Group 8-10 metal source 121 and the nitrogen-containing compound 123 can be placed under these or other non-reactive gases to, e.g., degas various components or otherwise remove oxygen from the reaction mixture.

The second conditions in operation 220 can include introduction conditions 112 and reaction conditions 114 of FIG. 1A. The introduction conditions 112 refer to the conditions at which the third precursor comprising the Group 8-10 metal complex 111 is introduced to the mixture 109 comprising the copper complex 105, the phosphorous-containing compound 107, and optional solvent by, e.g., injection, addition, or otherwise combining the third precursor with the mixture 109. The reaction conditions 114 refer to the conditions at which the third precursor comprising the Group 8-10 metal complex 111 and one or more components of the mixture 109 are reacted. The introductions conditions 112 and reaction conditions 114 can be the same or different.

The introduction conditions 112 include an introduction temperature. The introduction temperature, or injection temperature, of operation 220 can be about 400° C. or less, such as from about 50° C. to about 400° C., such as from about 75° C. to about 375° C., such as from about 80° C. to about 340° C., such as from about 90° C. to about 330° C., such as from about 100° C. to about 320° C., such as from about 110° C. to about 310° C., such as from about 120° C. to about 300° C., such as from about 130° C. to about 290° C., such as from about 140° C. to about 280° C., such as from about 150° C. to about 270° C., such as from about 160° C. to about 250° C., such as from about 170° C. to about 250° C., such as from about 180° C. to about 240° C., such as from about 190° C. to about 230° C., such as from about 200° C. to about 220° C. In some aspects, the introduction temperature or injection temperature of operation 220 can be from about 80° C. to about 320° C., such as from about 80° C. to about 150° C. or from about 180° C. to about 320° C., such as from about 200° C. to about 300° C. Higher or lower introduction/injection temperatures can be used when appropriate.

The resultant mixture containing the copper complex 105, the phosphorous-containing compound 107, the Group 8-10 metal complex 111, and the optional solvent, can be stirred, mixed or otherwise agitated at the introduction temperature for a time period of about 1 min or more or about 24 h or less, such as from about 1 min to about 12 h, such as from about 5 min to about 6 h, such as from about 10 min to about 3 h, such as from about 15 min to about 1 h. The introduction conditions 112 of operation 220 can optionally include introducing $N_2$, Ar, and/or other non-reactive gases prior to, during, and/or after, introducing the third precursor comprising the Group 8-10 metal complex 111 to the mixture 109.

After introduction of the Group 8-10 metal complex 111 to the mixture 109, one or more components of the resultant mixture react, under reaction conditions 114, to form the bimetallic structure 113. Here, the reaction conditions 114 of operation 220 can include heating the mixture containing the copper complex 105, the phosphorous-containing compound 107, the Group 8-10 metal complex 111, and the optional solvent, at a reaction temperature of about 400° C. or less, such as from about 50° C. to about 400° C., such as from about 75° C. to about 375° C., such as from about 80° C. to about 340° C., such as from about 90° C. to about 330° C., such as from about 100° C. to about 320° C., such as from about 110° C. to about 310° C., such as from about 120° C. to about 300° C., such as from about 130° C. to about 290° C., such as from about 140° C. to about 280° C., such as from about 150° C. to about 270° C., such as from about 160° C. to about 260° C., such as from about 170° C. to about 250° C., such as from about 180° C. to about 240° C., such as from about 190° C. to about 230° C., such as from about 200° C. to about 220° C. In some aspects, the reaction temperature of reaction conditions 114 can be from about 80° C. to about 320° C., such as from about 80° C. to about 150° C. or from about 180° C. to about 320° C., such as from about 200° C. to about 300° C. Higher or lower temperatures can be used when appropriate. The reaction conditions 114 of operation 220 can include a time of about 1 min or more or about 24 or less, such as from about 1 min to about 12 h, such as from about 5 min to about 3 h, such as from about 10 min to about 1 h. Higher or lower temperatures and/or more or less periods of time can be used when appropriate. Stirring, mixing, and/or agitation can be performed to, e.g., ensure homogeneity. The reaction conditions 114 of operation 220 can include introducing $N_2$, Ar, and/or other non-reactive gases before, during, and/or after reaction of the one or more components.

In some examples, the reaction conditions 114 include an operating temperature that is higher than, less than, or equal to the operating temperature of the introduction conditions 112.

After a suitable time, the reaction product mixture comprising the bimetallic structure 113 formed during operation 220 can be subjected to filtration, separation, cleaning, quenching, washing, purification, and/or other suitable processes to remove undesired components and isolate the bimetallic structure 113 from the other components of the reaction product mixture. For example, the reaction product mixture comprising the bimetallic structure 113 can be centrifuged to separate the bimetallic structure 113 (which may be in the form of particles) from the reaction product mixture. Additionally, or alternatively, the bimetallic structure 113 can be washed with polar solvent(s), such as water, acetone, ethanol, methanol, or combinations thereof, and/or non-polar solvent(s), such as hexane, pentane, toluene, or combinations thereof. Other solvents for washing can include ether solvents such as diethyl ether and tetrahydrofuran; chlorocarbon solvents such as dichloromethane and chloroform; as well as ethyl acetate, dimethylformamide, acetonitrile, benzene, isopropanol, n-butanol, n-propanol. Mixtures of two or more of these solvents, in suitable proportions, can be utilized for washing, purifying, or otherwise separating the bimetallic structure 113 from other components in the reaction product mixture. As an example, a solvent or mixture of solvents can be added to the bimetallic structure 113 and the resultant mixture centrifuged. The supernatant can be discarded and the remaining pellet can be dispersed in a suitable solvent or mixture of solvents. The resultant pellet and solvent(s) can then be centrifuged to obtain the bimetallic structure 113.

As a non-limiting example of operation 220, an alkylphosphine with or without a nitrogen-containing compound, such as OLA, can be degassed using a non-reactive gas while agitating. The alkylphosphine with or without a nitrogen-containing compound can be heated to a temperature of about 275° C. to about 350° C. A copper amine is then added to the alkylphosphine and agitated. The resultant mixture (e.g., mixture 109) containing the copper amine and the alkylphosphine is then set to introduction conditions 112 such as an introduction temperature from about 100° C. to about 140° C., stirred for a suitable period of time, under suitable pressures, with or without the presence of a non-reactive gas. The third precursor comprising a Group 8-10 metal amine, with or without a nitrogen-containing compound, is then added to the mixture at this introduction temperature and stirred under the introduction conditions 112 for a suitable period of time, under suitable pressures, with or without the presence of a non-reactive gas. At a selected time point, the mixture of the Group 8-10 metal amine, alkylphosphine, and copper amine are placed under the reaction conditions 114. The reactions conditions 114 can be the same or different conditions as the introduction conditions 112. In this example, the reaction conditions 114 include heating the mixture of the Group 8-10 metal amine, alkylphosphine, copper amine, and optional nitrogen-containing compound(s) (as solvent(s)), at a temperature from about 225° C. to about 275° C. for a suitable period of time, under suitable pressures, and with or without the presence of a non-reactive gas, to form the bimetallic structure 113. The bimetallic structure 113 can then be subjected to filtration, separation, cleaning, quenching, washing, purification, and/or other suitable processes to remove undesired components and/or isolate the bimetallic structure 113 from the other components of the reaction mixture.

Figure 2B:
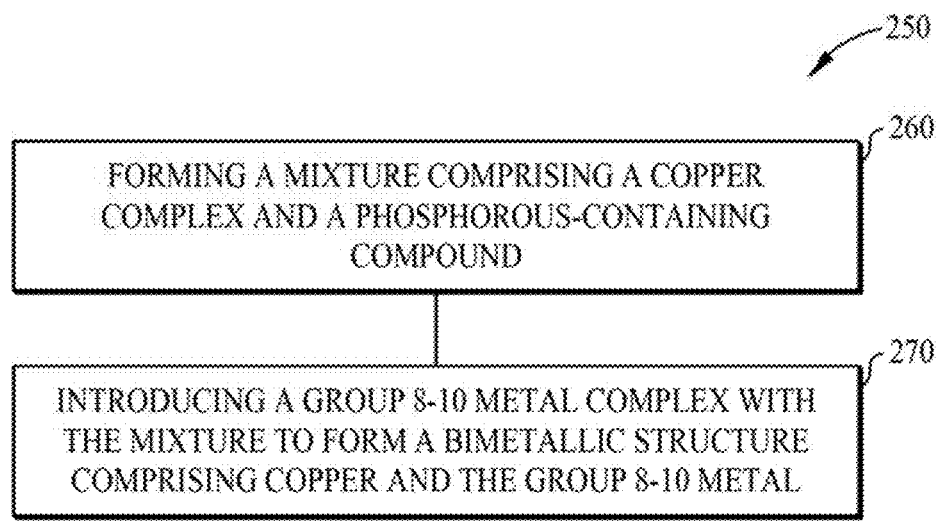
FIG. 2B is a flowchart showing selected operations of an example process for producing a copper-containing bimetallic structure according to at least one aspect of the present disclosure.

FIG. 2B is a flowchart showing selected operations of an example process 250 for producing a copper-containing bimetallic structure according to at least one aspect of the present disclosure. The process 250 includes forming a mixture 109, under first conditions, comprising a copper complex 105 and a phosphorous-containing compound 107 at operation 260. The copper complex 105, phosphorous-containing compound, the mixture 109, and the first conditions of operation 260 are described above in relation to process 200 of FIG. 2A. The process 250 further includes introducing a Group 8-10 metal complex 111 with the mixture 109 to form a bimetallic structure 113 at operation 270. The bimetallic structure 113 formed can be a copper-containing bimetallic structure having the formula $(Cu)_a (M)_b (P)_c (N)_d$ as described above. Chemical and physical properties of the bimetallic structure 113 are also described above. The Group 8-10 metal complex 111, the mixture 109, the bimetallic structure 113 formed, and the second conditions of operation 270 are described above in relation to process 200 of FIG. 2A.

The processes for forming the copper-containing bimetallic structures are efficient and utilize low-cost materials. As illustrated herein, the copper-containing bimetallic structures can be synthesized in one operation (and in one reactor) from a copper complex, a phosphorous-containing compound, and a Group 8-10 metal complex.

Uses of the Copper-Containing Bimetallic Structures

The present disclosure also relates to uses of the copper-containing bimetallic structures described herein. For example, the copper-containing bimetallic structures described herein can be utilized as a catalyst for various reactions, e.g., electrochemical oxygen reduction reactions and hydrogen evolution reactions. The copper-containing bimetallic structures made by aspects described herein have a large number of active sites for catalyzing desired reactions which increases the activity and atom-economy of these structures over conventional structures.

In some examples, a process for using the copper-containing bimetallic structures can include introducing a copper-containing bimetallic structures ((e.g., those having the formula $(Cu)_a(M)_b(P)_c(N)_d)$) to a starting material and/or a reactant to form product(s). For example, a process for converting water to conversion product(s) can include introducing the copper-containing bimetallic structures to water and obtaining reaction products, e.g., $H_2$, $O_2$, and a combination thereof.

In another example, a process for converting oxygen to conversion product(s) can include introducing the copper-containing bimetallic structures to $O_2$ to obtain reaction product(s). The reaction products of the oxygen reduction reaction depend on, e.g., the electrolyte media. For example, when the reduction is performed in acidic aqueous solutions, the products include hydrogen peroxide, water, or both. In alkaline aqueous solution, the products include hydroxide ion ($OH^-$), $HO_2^-$, or both. In non-aqueous aprotic solvents, the products include $O_2^-$, $O_2^{2-}$, or both.

In various applications, the copper-containing bimetallic structures described herein can be integrated into a portion of a PEMFC device, such as the cathode of a PEMFC device. PEMFC devices can be used as power sources in electric vehicles as well as portable and stationary devices.

The following examples are put forth so as to provide those of ordinary skill in the art with a complete disclosure and description of how to make and use aspects of the present disclosure, and are not intended to limit the scope of aspects of the present disclosure. Further, while the present disclosure refers to "nanoparticles", it will be appreciated that the disclosure may be applied to particles having a larger size (e.g., "microparticles" and "macroparticles"). Similarly, while the present disclosure refers to nanocrystals, it will be appreciated that the disclosure may be applied to crystals having larger size such as microcrystals and macrocrystals. In addition, efforts have been made to ensure accuracy with respect to numbers used (e.g. amounts, dimensions, etc.) but some experimental errors and deviations should be accounted for.

EXAMPLES

Copper chloride (CuCl, 99.0%), tributylphosphine (TBP, 99%), trioctylphosphine (TOP, 97%), oleylamine (OLA, 70%), nickel acetylacetonate (Ni(acac)$_2$), nickel nitrate (Ni(NO$_3$)$_2$), nickel chloride (NiCl$_2$), cobalt acetylacetonate (Co(acac)$_2$), iron (II) acetylacetonate (Fe(acac)$_2$), toluene (99.9%), acetone (99%), and chloroform (99.9%), 1-octadecene (ODE, 98%) were purchased from Sigma-Aldrich. Tetradecylamine (TDA, >96%) was purchased from TCI America. Hexane (99%), methanol (99%), and ethanol (200 proof) were purchase from Fisher Chemicals. All chemicals were used as received.

SEM images were captured using a QUANTA™ FEG 650 scanning electron microscope (from FEI Tecnai) with a field emitter as the electron source. Surface morphologies were also investigated using the QUANTA™ FEG 650 scanning electron microscope. Transmission electron microscopy (TEM) images were captured using an FEI Tecnai 20 microscope with an accelerating voltage of 200 kV.

X-ray diffraction (XRD) patterns were obtained using a Bruker D8 Advance X-ray diffractometer with Cu Kα radiation operated at a tube voltage of 40 kV and a current of 40 mA. Energy Dispersive X-Ray spectroscopy (EDS) images and high-angle annular dark-field (HAADF) images were collected by employing a probe-corrected Titan$^3$™ 80-300 S/TEM with an accelerating voltage of 300 kV.

Example 1: Synthesis of Example Metal Amines

Ex. 1A. Synthesis of Copper-TDA (Cu-TDA): Copper (I) chloride (~100 mg, ~1 mmol), TDA (~240 mg), and ODE (~2 mL) were mixed in a flask under an Ar or N$_2$ environment to form a solution/suspension. After degassing for about 20 minutes, the solution/suspension was heated to about 200° C. under Ar and/or Na. After keeping the solution/suspension at this temperature for about 10 minutes, the solution/suspension was cooled to room temperature. This Cu-TDA solution/suspension was utilized as a Cu-TDA stock solution.

Ex. 1B. Synthesis of Nickel-OLA (Ni-OLA): Ni(acac)$_2$ (~128 mg, ~0.5 mmol) and OLA (~4 mL) were mixed in a flask under an Ar or N$_2$ environment to form a solution/suspension. The solution/suspension was then heated at about 50-150° C. and shaken for about 5 minutes. The solution/suspension was then cooled to about room temperature. This Ni-OLA solution/suspension was utilized as a Ni-OLA stock solution.

Example 2: Synthesis of Example Polyhedral Nanoparticles

Ex. 2A. Synthesis of Cu—Ni polyhedral nanoparticles: OLA (70%, ~6 mL) was added to a 50 mL three-neck flask where oxygen was removed by Ar or N$_2$ blowing for ~20 min. After degassing, TOP (~1 mL) was injected into the three-neck flask under an Ar or N$_2$ environment. After degassing for about 20 minutes, the mixture was rapidly heated to about 300° C. under Ar and/or N$_2$. Next, ~2 mL of the Cu-TDA stock solution (Ex. 1A) was quickly injected into the three-neck flask, and the reaction solution turned to a red color. The reaction solution was then cooled to a temperature of about 120° C. and then ~4 mL of the Ni-OLA stock solution (Ex. 1B) was injected, and the reaction solution was maintained at about 120° C. After about 1 hour at about 120° C., the reaction solution was heated to about 250° C. After about 5 minutes at about 250° C., the reaction solution was cooled to about room temperature and about 5 mL of hexane (or other hydrophobic solvent such as toluene and chloroform) and about 5 mL of ethanol were added into the three-neck flask. The resulting Cu—Ni polyhedral nanoparticles were isolated by centrifuging at about 4000 rpm for about 5 minutes, and the supernatant was discarded.

Hexane (about 10 mL) was then added to the pellet and the mixture was centrifuged at about 4000 rpm for ~5 minutes. Another amount of hexane (about 10 mL) was added to the pellet and the mixture was centrifuged at about 4000 rpm for about 5 minutes. The two washings aid removal of unreacted precursor and other materials. The Cu—Ni polyhedral nanoparticles were stored in a hydrophobic solvent (e.g., hexane, toluene, and/or chloroform) before characterization. The Cu—Ni polyhedral nanoparticles made according to this procedure are referred to as Ex. 2A.

Ex. 2B-2E. Syntheses of Cu—Ni polyhedral nanoparticles: For Ex. 2B-2E, a similar procedure to Ex. 2A was followed. However, the temperature at which the Ni precursor was injected at was 200° C., 250° C., 280° C., or 300° C. for Ex. 2B, Ex. 2C, Ex. 2D, and Ex. 2E, respectively. For Ex. 2B and after injection, the mixture was stirred at 200° C. for about 1 h and then the temperature was raised such that the reaction temperature was 250° C. After about 5 minutes, the reaction solution was cooled to about room temperature, at which point washing procedures with hexane and ethanol and centrifugation operations were performed as described above. For Ex. 2C, Ex. 2D, and Ex. 2E, their injection temperatures are equal to their reaction temperatures and the mixtures are stirred at this temperature for about 1 h. After about 5 minutes, the reaction solution was cooled to about room temperature, at which point washing procedures with hexane and ethanol and centrifugation operations were performed as described above.

Ex. 2F-2G. Syntheses of Cu—Ni Polyhedral Nanoparticles: For Ex. 2F and Ex. 2G, a similar procedure to Ex. 2A was followed. However, a different Ni stock solution was used to form the nanoparticles. Here, the Ni stock solution was made from nickel nitrate (Ex. 2F) or nickel chloride (Ex. 2G) instead of nickel acetylacetonate of Ex. 1B. The nickel nitrate and nickel chloride were then made into Ni-OLA stock solutions in a similar procedure as described for Ex. 1B.

Ex. 2H. Synthesis of Cu—Ni Polyhedral Nanoparticles Using Tributylphosphine: In this example, a similar procedure to Ex. 2A was followed. However, tributylphosphine (TBP) was used instead of trioctylphosphine.

Ex. 2I Synthesis of Cu—Co Polyhedral Nanoparticles: Cu—Co polyhedral nanoparticles were synthesized using a similar procedure as that described in Ex. 2A, except that a Co-OLA precursor was used instead of the Ni-OLA precursor. The Co-OLA precursor was formed using a similar procedure as that described in Ex. 1B, except that Co(acac)$_2$ was used as the metal source instead of Ni(acac)$_2$.

Ex. 2J. Synthesis of Cu—Fe Polyhedral Nanoparticles: Cu—Fe polyhedral nanoparticles were synthesized using a similar procedure as that described in Ex. 2A, except that a Fe-OLA precursor was used instead of the Ni-OLA precursor. The Fe-OLA precursor was formed using a similar procedure as that described in Ex. 1B, except that Fe(acac)$_2$ was used as the metal source instead of Ni(acac)$_2$.

Figure 3:
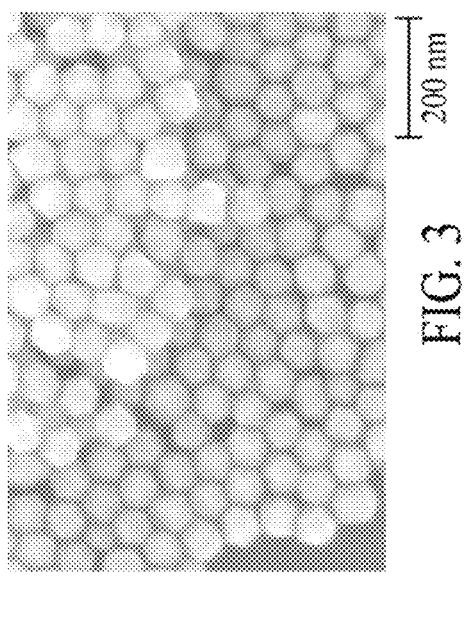
FIG. 3 is an exemplary transmission electron microscope (TEM) image of example copper-nickel (Cu—Ni) nanoparticles according to at least one aspect of the present disclosure (Scale: 200 nm).
Figure 4A:
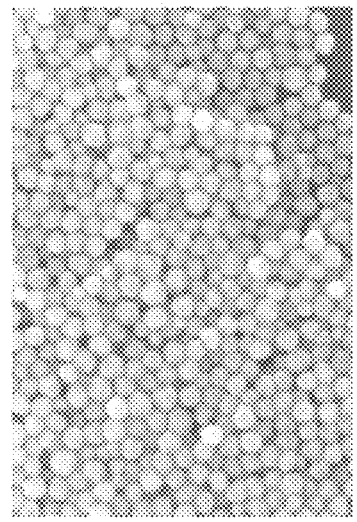
FIG. 4A is an exemplary scanning electron microscope (SEM) image of example Cu—Ni polyhedral nanoparticles according to at least one aspect of the present disclosure (Scale: 200 nm).
Figure 4B:
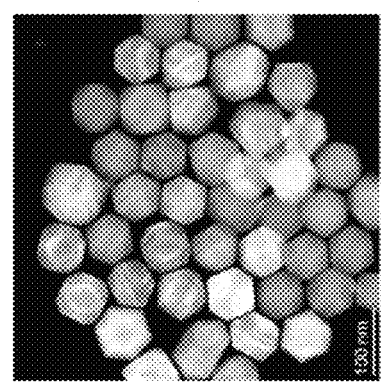
FIG. 4B is an exemplary high-angle annular dark field-scanning transmission electron microscopy (HAADF-STEM) image of example Cu—Ni polyhedral nanoparticles according to at least one aspect of the present disclosure (Scale: 100 nm).
Figure 4C:
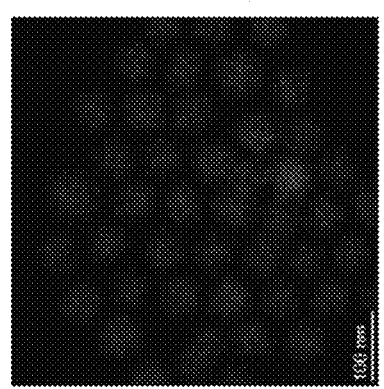
FIG. 4C is an exemplary energy dispersive spectroscopy (EDS) image showing the Cu portion of example Cu—Ni polyhedral nanoparticles according to at least one aspect of the present disclosure (Scale: 100 nm).
Figure 4D:
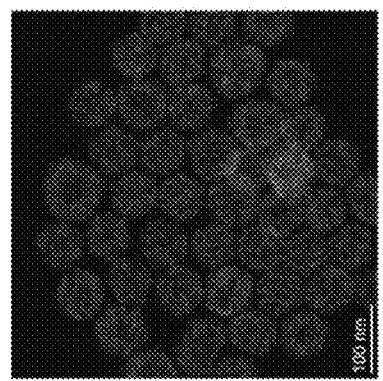
FIG. 4D is an exemplary EDS image showing the Ni portion of example Cu—Ni polyhedral nanoparticles according to at least one aspect of the present disclosure (Scale: 100 nm).

FIG. 3 is an exemplary TEM image of example Cu—Ni polyhedral nanoparticles made according to Ex. 2A described above. In this example, the Ni precursor was injected at a temperature of about 120° C. The TEM image indicates that the Cu—Ni polyhedral nanoparticles are uniform. The SEM image of FIG. 4A indicates that more than about 90% of the nanoparticles formed by the conditions of Ex. 2A were dodecahedral structures. The HAADF-STEM image (FIG. 4B) image further indicates that the majority of the nanoparticles of Ex. 2A adopt the morphology of polyhedrons. The HAADF-STEM image also shows that the average particle size of the Cu—Ni polyhedral nanoparticles is about 68 nm. The core-shell structure of the nanoparticles (Ex. 2A) is confirmed by the EDX mapping images of FIG. 4C and FIG. 4D. The location of Cu is primarily in the interior of each nanoparticle structure (FIG. 4C) while Ni is distributed primarily in the outer-region of each nanoparticle structure (FIG. 4D).

Figure 6:
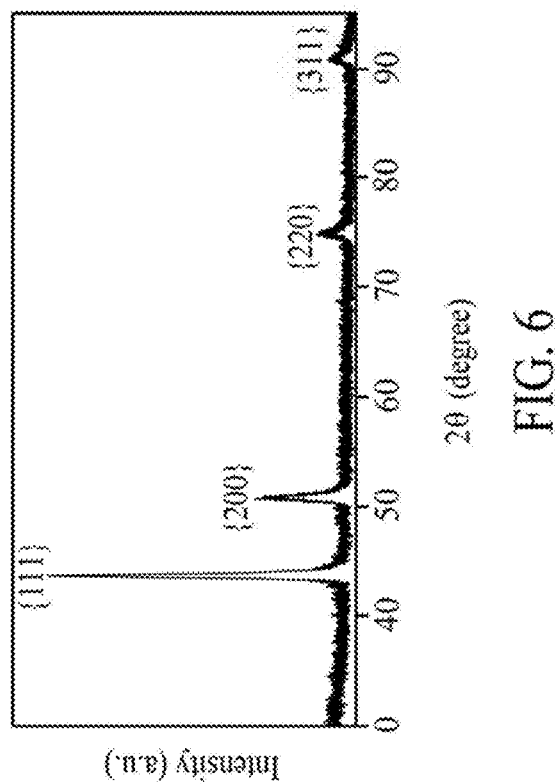
FIG. 6 is an exemplary X-ray diffraction (XRD) pattern of the example Cu—Ni polyhedral nanoparticles according to at least one aspect of the present disclosure.
Figure 5:
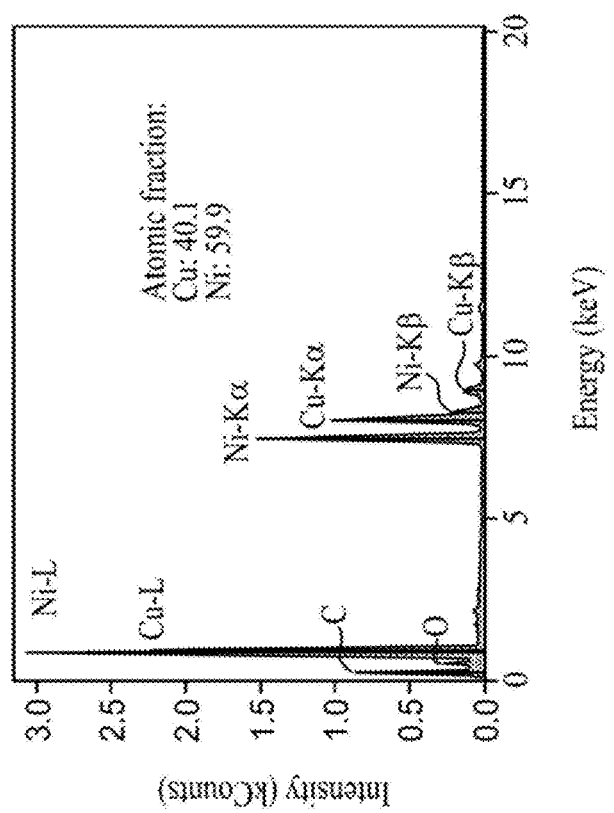
FIG. 5 is an exemplary energy dispersive X-ray (EDX) spectrum of example Cu—Ni polyhedral nanoparticles according to at least one aspect of the present disclosure.
Figure 7A:
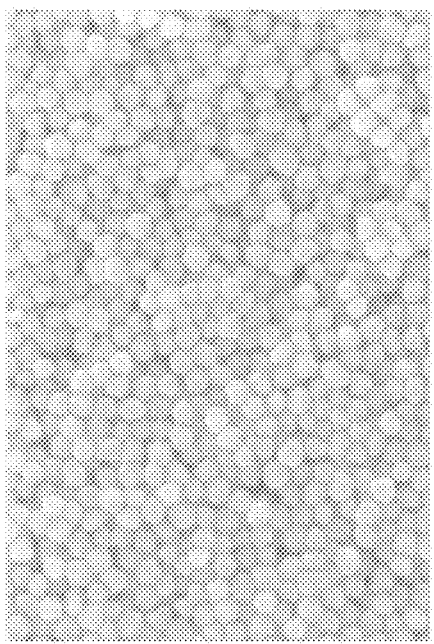
FIG. 7A is an exemplary SEM image of example Cu—Ni polyhedral nanoparticles formed at 200° C. according to at least one aspect of the present disclosure (Scale: 300 nm).
Figure 7B:
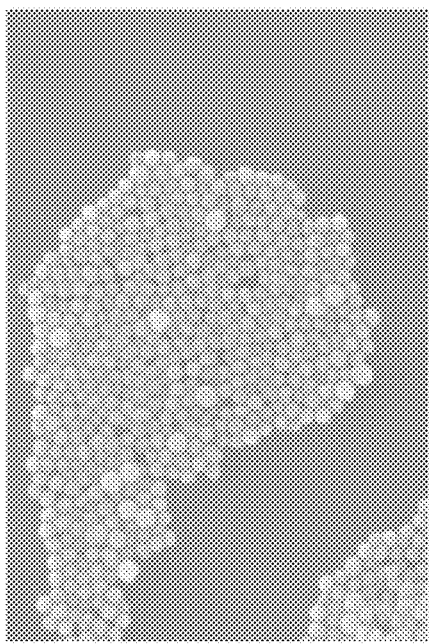
FIG. 7B is an exemplary SEM image of example Cu—Ni polyhedral nanoparticles formed at 250° C. according to at least one aspect of the present disclosure (Scale: 300 nm).
Figure 7C:
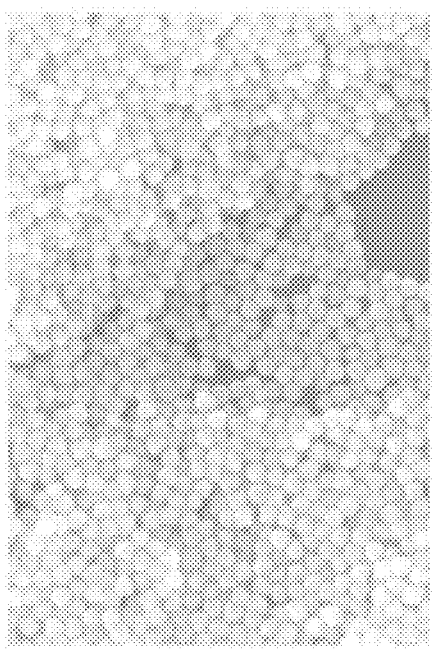
FIG. 7C is an exemplary SEM image of example Cu—Ni polyhedral nanoparticles formed at 280° C. according to at least one aspect of the present disclosure (Scale: 300 nm).
Figure 7D:
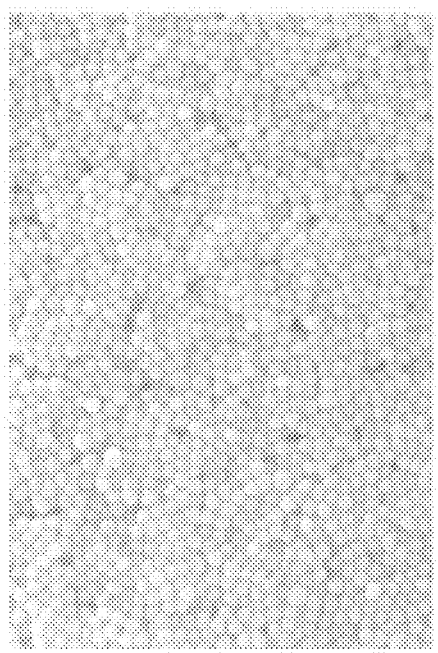
FIG. 7D is an exemplary SEM image of example Cu—Ni polyhedral nanoparticles formed at 300° C. according to at least one aspect of the present disclosure (Scale: 300 nm).

FIG. 5 shows an EDX spectrum of the Cu—Ni polyhedral nanoparticles (Ex. 2A). The EDX spectrum indicates that molar ratio of Cu to Ni is about 40:60. FIG. 6 is an XRD pattern of these Cu—Ni polyhedral nanoparticles. The XRD pattern shows that the Cu—Ni polyhedral nanoparticles have a face centered cubic structure as indicated by the {111}, {200}, and {220} diffraction peaks. Further, no oxidation peaks were observed in the XRD pattern, indicating that the Cu—Ni polyhedral nanoparticles are stable in solution.

Figure 8:
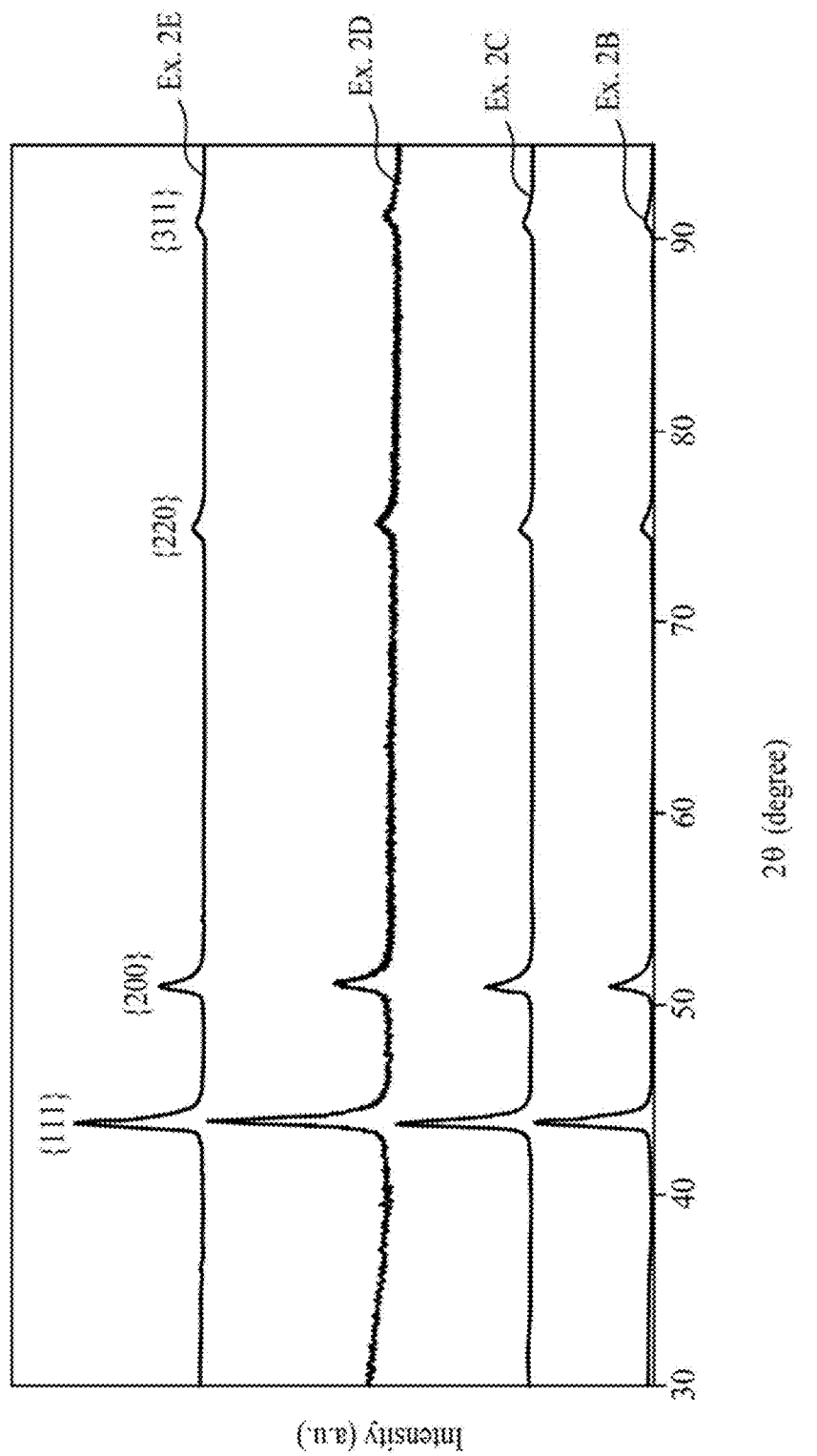
FIG. 8 shows exemplary XRD patterns of the example Cu—Ni polyhedral nanoparticles formed at the various temperatures according to at least one aspect of the present disclosure.

Cu—Ni polyhedral nanoparticles were also synthesized utilizing different injection temperatures—about 200° C. (Ex. 2B), about 250° C. (Ex. 2C), about 280° C. (Ex. 2D), about 300° C. (Ex. 2E). For these examples, the Ni precursor of Ex. 1B was injected at these different injection temperatures. The SEM images of the Cu—Ni polyhedral nanoparticles of Ex. 2B, Ex. 2C, Ex. 2D, and Ex. 2E are shown in FIGS. 7A, 7B, 7C, and 7D, respectively. These SEM images indicate that more than about 90% of the nanoparticles formed by these conditions were dodecahedral structures. Corresponding XRD patterns for Ex. 2B-2E are shown in FIG. 8. These XRD patterns confirmed that the Cu—Ni polyhedral nanoparticles are in an alloy phase because the typical diffraction peaks at {111}, {200}, and {220} were located between the diffraction peaks of pure Cu and pure Ni.

Figure 9A:
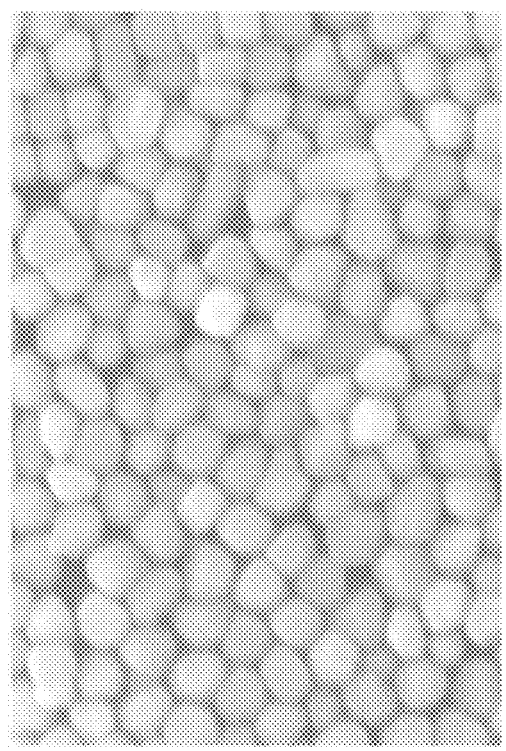
FIG. 9A is an exemplary SEM image of example Cu—Ni polyhedral nanoparticles formed using nickel nitrate (Ni(NO$_3$)$_2$) according to at least one aspect of the present disclosure (Scale: 200 nm).
Figure 9B:
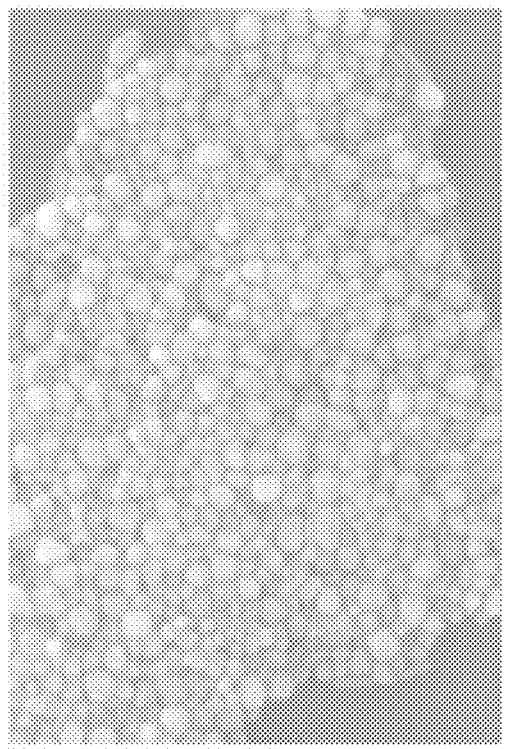
FIG. 9B is an exemplary SEM image of example Cu—Ni polyhedral nanoparticles formed using nickel chloride (NiCl$_2$) according to at least one aspect of the present disclosure (Scale: 200 nm).
Figure 9C:
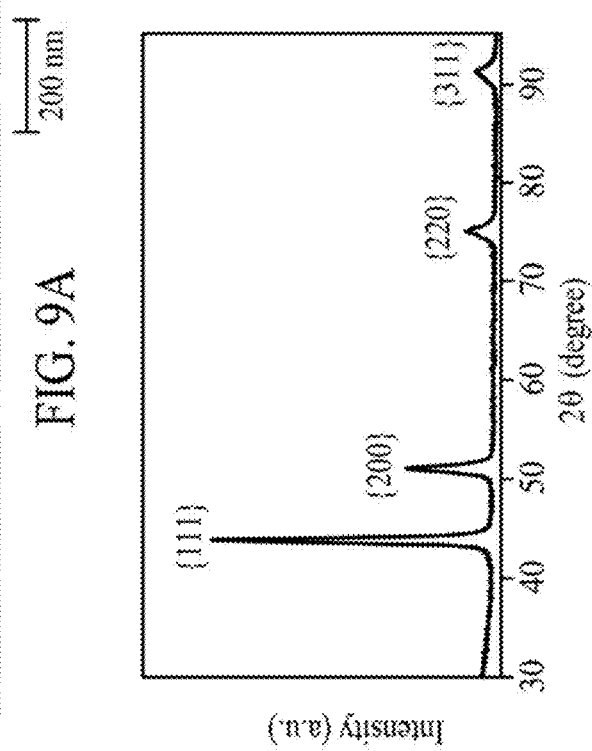
FIG. 9C is an exemplary XRD pattern of example Cu—Ni polyhedral nanoparticles formed using Ni(NO$_3$)$_2$ according to at least one aspect of the present disclosure.
Figure 9D:
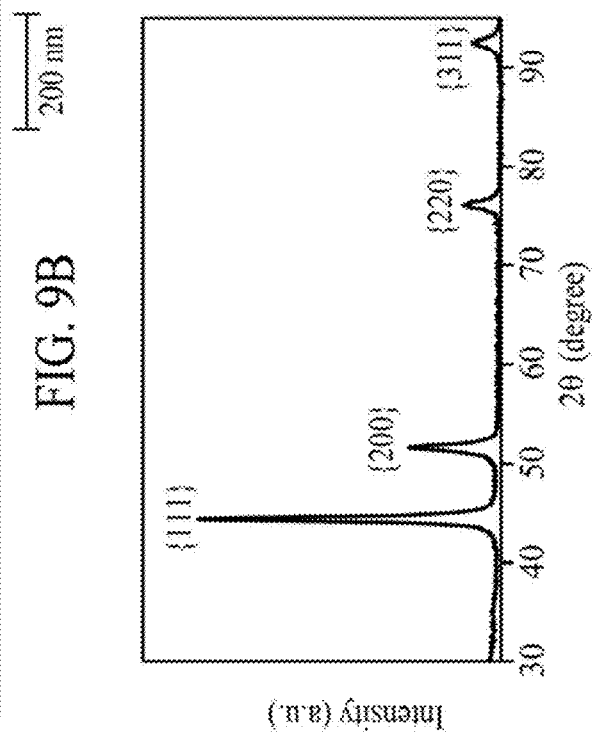
FIG. 9D is an exemplary XRD pattern of example Cu—Ni polyhedral nanoparticles formed using NiCl$_2$ precursor according to at least one aspect of the present disclosure.

Cu—Ni polyhedral nanoparticles were also synthesized using nickel nitrate (Ex. 2F) or nickel chloride (Ex. 2G) instead of nickel acetylacetonate as described above. SEM images of these Cu—Ni polyhedral nanoparticles are shown in FIG. 9A (Ex. 2F) and FIG. 9B (Ex. 2G). The SEM images of FIGS. 9A and 9B indicate that more than about 90% of the nanoparticles formed by these conditions were dodecahedral structures. Corresponding XRD patterns for Ex. 2F and Ex. 2G are shown in FIG. 9C and FIG. 9D, respectively. These XRD patterns confirmed that the Cu—Ni polyhedral nanoparticles are in an alloy phase because the typical diffraction peaks at {111}, {200}, and {220} were located between the diffraction peaks of pure Cu and pure Ni.

Figure 10A:
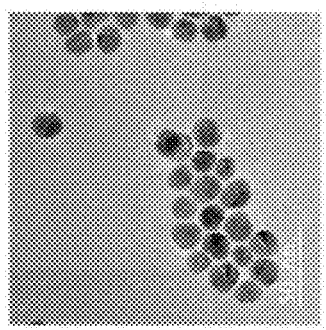
FIG. 10A is an exemplary SEM image of example Cu—Ni polyhedral nanoparticles formed using tributylphosphine according to at least one aspect of the present disclosure (Scale: 200 nm).
Figure 10B:
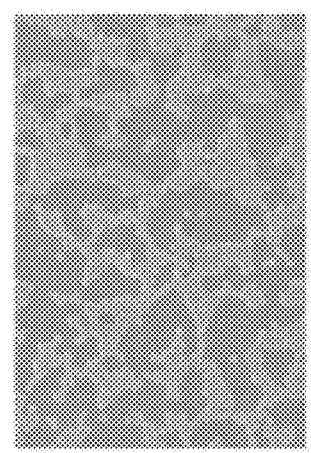
FIG. 10B is an exemplary TEM image of example Cu—Ni polyhedral nanoparticles formed using tributylphosphine according to at least one aspect of the present disclosure (Scale: 50 nm).
Figure 10C:
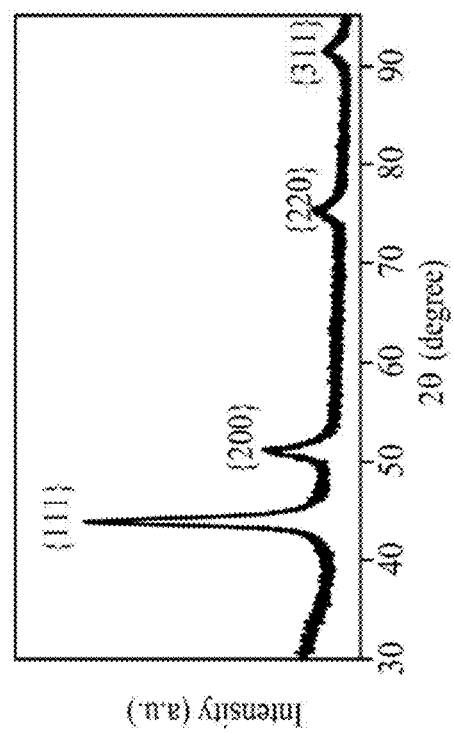
FIG. 10C is an exemplary XRD pattern of example Cu—Ni polyhedral nanoparticles formed using tributylphosphine according to at least one aspect of the present disclosure.

Cu—Ni polyhedral nanoparticles were also synthesized by using tributylphosphine (Ex. 2H) instead of trioctylphosphine (Ex. 2A). For this experiment, the other synthesis conditions remained the same. When using trioctylphosphine as a ligand (Ex. 2A), the average particle size of the Cu—Ni polyhedral nanoparticles can vary from about 40 nm to about 100 nm. When employing tributylphosphine as a ligand (Ex. 2H), the average particle size of the Cu—Ni polyhedral nanoparticles decreased to about 15 nm as shown in FIGS. 10A and 10B. While not wishing to be bound by theory, the smaller size for the particles of Ex. 2H may be due to the stronger coordinating ability of tributylphosphine to copper and nickel atoms than that of trioctylphosphine, which may reduce the nucleation and/or growth speed of Cu—Ni polyhedral nanoparticles. These results indicate that the size of the Cu—Ni polyhedral nanoparticles can be controlled. The XRD pattern of the Cu—Ni polyhedral nanoparticles (Ex. 2H) are shown in FIG. 10C. The XRD pattern confirmed that the Cu—Ni polyhedral nanoparticles are in an alloy phase because the typical diffraction peaks at {111}, {200}, and {220} were located between the diffraction peaks of pure Cu and pure Ni.

Figure 11B:
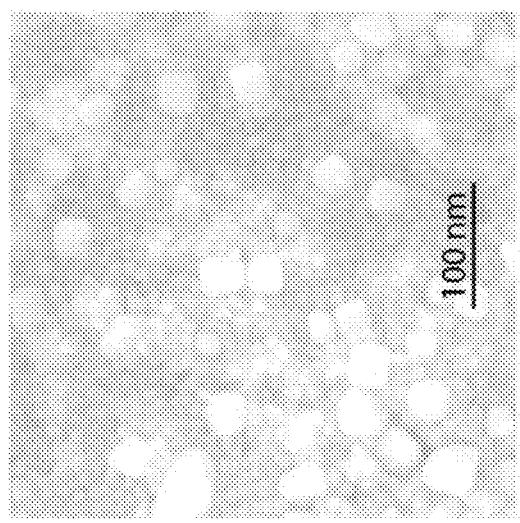
FIG. 11B is an exemplary SEM image of example copper-iron (Cu—Fe) polyhedral nanoparticles according to at least one aspect of the present disclosure (Scale: 100 nm).
Figure 11A:
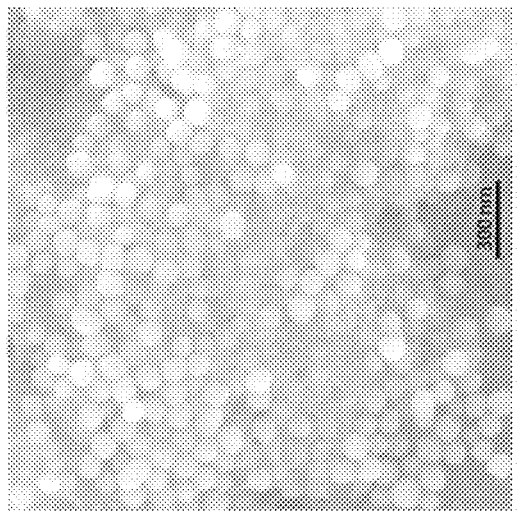
FIG. 11A is an exemplary SEM image of example copper-cobalt (Cu—Co) polyhedral nanoparticles according to at least one aspect of the present disclosure (Scale: 100 nm).
Figure 11C:
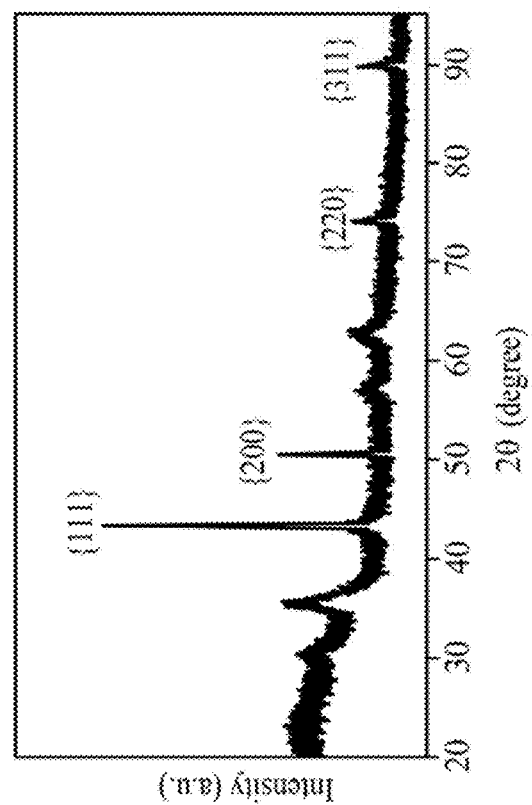
FIG. 11C is an exemplary XRD pattern of example Cu—Co polyhedral nanoparticles according to at least one aspect of the present disclosure.
Figure 11D:
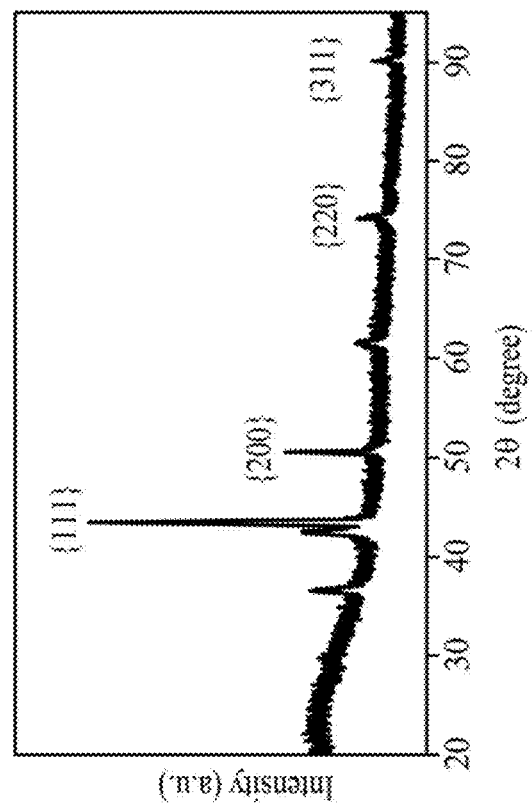
FIG. 11D is an exemplary XRD pattern of example Cu—Fe polyhedral nanoparticles according to at least one aspect of the present disclosure.

Cu—Co polyhedral nanoparticles (Ex. 2I) and Cu—Fe polyhedral nanoparticles (Ex. 2J) were also synthesized as described above. SEM images of the Cu—Co polyhedral nanoparticles and the Cu—Fe polyhedral nanoparticles are shown in FIG. 11A and FIG. 11B, respectively. XRD patterns of the Cu—Co polyhedral nanoparticles and the Cu—Fe polyhedral nanoparticles are shown in FIG. 11C and FIG. 11D, respectively. The SEM images indicate that Cu—Co polyhedral nanoparticles and Cu—Fe polyhedral nanoparticles can be formed. The broad size distributions for both the Cu—Co polyhedral nanoparticles and the Cu—Fe polyhedral nanoparticles may be due to the cobalt and iron precursors being more susceptible to oxidation than the nickel precursor. These results demonstrate that various metals can be utilized to form polyhedral nanoparticles.

Overall, the results show that polyhedral nanoparticles that include copper and a Group 8-10 metal can be synthesized using different precursor compounds and metal sources such as phosphorous-containing compounds and nitrogen-containing compounds, copper sources, and Group 8-10 metal sources. The EDS images and XRD patterns indicate that the synthesized can be in the form of polyhedral nanoparticles and that the metals of the polyhedral nanoparticles are in an alloy phase. The TEM and SEM images show that the size of the polyhedral nanoparticles can be controlled utilizing, e.g., various reaction conditions.

Copper-containing bimetallic structures and processes for producing copper-containing bimetallic structures are described herein. The copper-containing bimetallic structures can be in the form of polyhedral nanostructures such as polyhedral nanoparticles. The metals (e.g., Cu and Ni) of the polyhedral nanoparticles are in an alloy phase. The processes described herein enable, e.g., control over the average particle size of the polyhedral nanoparticles. The processes described are efficient and represent a cost-effective way of fabricating catalysts for, e.g., fuel cells.

ASPECTS LISTING

The present disclosure provides, among others, the following aspects, each of which can be considered as optionally including any alternate aspects:

Clause 1. A process for forming a bimetallic structure, comprising:
  forming a mixture comprising a first precursor and a second precursor, the first precursor comprising copper, the second precursor comprising a phosphine;
  introducing a third precursor with the mixture to form the bimetallic structure, the third precursor comprising a Group 8-10 metal, the bimetallic structure comprising copper (Cu), the Group 8-10 metal (M), phosphorous (P), and nitrogen (N), the bimetallic structure having the formula $(Cu)_a(M)_b(P)_c(N)_d$, 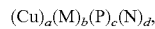

wherein:
    a molar ratio of a:b is from about 1:99 to about 99:1; and
    a molar ratio of a:(c+d) is from about 500:1 to about 1:1.

Clause 2. The process of Clause 1, wherein the third precursor is introduced at a first temperature of about 100° C. to about 320° C.

Clause 3. The process of Clause 2, wherein the third precursor and the mixture is reacted at a second temperature of about 100° C. to about 320° C., the second temperature being the same or different from the first temperature.

Clause 4. The process of any one of Clauses 1-3, wherein the phosphine is an alkylphosphine, an arylphosphine, or a combination thereof.

Clause 5. The process of any one of Clauses 1-4, wherein the phosphine comprises trimethylphosphine, triethylphosphine, tripropylphosphine, tributylphosphine, tripentylphosphine, trihexylphosphine, trioctylphosphine, tricyclohexylphosphine, diethylphosphine, dibutylphosphine, diphenylphosphine, dimethylethylphosphine, triphenylphosphine, isomers thereof, derivatives thereof, and combinations thereof.

Clause 6. The process of any one of Clauses 1-5, wherein the Group 8-10 metal comprises Fe, Ru, Os, Co, Rh, Ir, Ni, Pd, Pt, or combinations thereof.

Clause 7. The process of any one of Clauses 1-6, wherein the Group 8-10 metal comprises Ni, Fe, Co, or combinations thereof.

Clause 8. The process of any one of Clauses 1-7, wherein the first precursor comprising copper is formed by introducing a copper source to an amine.

Clause 9. The process of any one of Clauses 1-8, wherein the third precursor is formed by introducing a Group 8-10 metal source to an amine.

Clause 10. The process of any one of Clauses 1-9, wherein:
  the first precursor comprising copper is formed by introducing a copper source to a first amine;
  the third precursor is formed by introducing a Group 8-10 metal source to a second amine; and
  the first amine and the second amine are the same or different.

Clause 11. The process of Clause 10, wherein:
  the first amine comprises tetradecylamine, oleylamine, octadecylamine, hexadecylamine, dodecylamine, or combinations thereof; and
  the second amine comprises tetradecylamine, oleylamine, octadecylamine, hexadecylamine, dodecylamine, or combinations thereof.

Clause 12. The process of any one of Clauses 1-11, wherein an X-ray diffraction pattern of the bimetallic structure has {111}, {200}, and {220} diffraction peaks.

Clause 13. A bimetallic structure, comprising:
  a core comprising copper and a Group 8-10 metal, the core having a greater amount of copper than the Group 8-10 metal;
  a shell comprising copper and the Group 8-10 metal, the shell having a greater amount of the Group 8-10 metal than copper; and
  one or more ligands bonded to the copper of the core, the copper of the shell, the Group 8-10 metal of the core, the Group 8-10 metal of the shell, or combinations thereof, wherein:
    at least one of the one or more ligands comprises a nitrogen-containing ligand, and
    at least one of the one or more ligands comprises a phosphorous-containing ligand.

Clause 14. The bimetallic structure of Clause 13, wherein bimetallic structure has the formula:

$(Cu)_a(M)_b(P)_c(N)_d$, 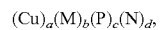

wherein:
    M is the Group 8-10 metal;
    a molar ratio of a:b is from about 1:99 to about 99:1; and
    a molar ratio of a:(c+d) is from about 500:1 to about 1:1.

Clause 15. The bimetallic structure of Clause 13 or Clause 14, wherein the nitrogen-containing ligand comprises oleylamine (OLA), octadecylamine (ODA), hexadecylamine (HDA), dodecylamine (DDA), tetradecylamine (TDA), isomers thereof, derivatives thereof, or combinations thereof.

Clause 16. The bimetallic structure of any one of Clauses 13-15, wherein the phosphorous-containing ligand comprises an alkylphosphine, an arylphosphine, or a combination thereof.

Clause 17. The bimetallic structure of any one of Clauses 13-16, wherein the phosphorous-containing ligand comprises trimethylphosphine, triethylphosphine, tripropylphosphine, tributylphosphine, tripentylphosphine, trihexylphosphine, trioctylphosphine, tricyclohexylphosphine, diethylphosphine, dibutylphosphine, diphenylphosphine, dimethylethylphosphine, triphenylphosphine, isomers thereof, derivatives thereof, and combinations thereof.

Clause 18. The bimetallic structure of any one of Clauses 13-17, wherein:
the Group 8-10 metal comprises Fe, Ru, Os, Co, Rh, Ir, Ni, Pd, Pt, or combinations thereof;
the bimetallic structure is characterized as having a face centered cubic structure as determined by X-ray diffraction; or
both.

Clause 19. A process for forming a conversion product, comprising:
introducing a reactant to a bimetallic structure described herein; and
forming the conversion product.

Clause 20. A process for forming a conversion product, comprising:
introducing a reactant to a bimetallic structure; and
forming the conversion product, the bimetallic structure comprising copper (Cu), a Group 8-10 metal (M), phosphorous (P), and nitrogen (N), the bimetallic structure having the formula $(Cu)_a(M)_b(P)_c(N)_d$, wherein:
a molar ratio of a:b is from about 1:99 to about 99:1; and
a molar ratio of c:d is from about 1:100 to about 1:20.

Clause 21. The process of Clause 20, wherein the bimetallic structure is a polyhedral particle, the polyhedral particle having more than four faces as determined by scanning electron microscopy.

Clause 22. A metal particle, comprising:
a core comprising copper and a Group 8-10 metal, the core having a greater amount of copper than the Group 8-10 metal;
a shell comprising copper and the Group 8-10 metal, the shell having a greater amount of the Group 8-10 metal than copper; and
one or more ligands bonded to the copper of the core, the copper of the shell, the Group 8-10 metal of the core, the Group 8-10 metal of the shell, or combinations thereof, wherein:
at least one of the one or more ligands comprises a nitrogen-containing ligand, and
at least one of the one or more ligands comprises a phosphorous-containing ligand.

Clause 23. The metal particle of Clause 22, wherein the metal particle has the formula:

$(Cu)_a(M)_b(P)_c(N)_d$, wherein:
M is the Group 8-10 metal;
a molar ratio of a:b is from about 1:99 to about 99:1; and
a molar ratio of a:(c+d) is from about 500:1 to about 1:1.

Clause 24. The metal particle of Clause 22 or Clause 23, wherein an amount of copper in the core is greater than, less than, or equal to an amount of Group 8-10 metal in the core.

Clause 25. The metal particle of any one of Clauses 22-24, wherein an amount of Group 8-10 metal in the shell is greater than, less than, or equal to an amount of copper in the shell.

Clause 26. The metal particle of any one of Clauses 21-25, wherein the Group 8-10 metal comprises Fe, Ru, Os, Co, Rh, Ir, Ni, Pd, Pt, or combinations thereof.

Clause 27. The metal particle of any one of Clauses 21-26, wherein:
the metal particle has an average particle size of about 5 nm to about 2000 μm, as determined by transmission electron microscopy;
the metal particle is characterized as having a face centered cubic structure as determined by X-ray diffraction; or
both.

As used herein, and unless otherwise specified, the term "Ce" means hydrocarbon(s) having n carbon atom(s) per molecule, wherein n is a positive integer. The term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n. Likewise, a "$C_m$-$C_y$" group or compound refers to a group or compound comprising carbon atoms at a total number thereof in the range from m to y. Thus, a $C_1$-$C_{50}$ alkyl group refers to an alkyl group comprising carbon atoms at a total number thereof in the range from 1 to 50.

For purposes of this disclosure, and unless otherwise specified, the terms "hydrocarbyl radical," "hydrocarbyl group," or "hydrocarbyl" interchangeably refer to a group consisting of hydrogen and carbon atoms only. A hydrocarbyl group can be saturated or unsaturated, linear or branched, cyclic or acyclic, aromatic, or non-aromatic. For the purposes of this disclosure, and unless otherwise specified, the term "aryl" refers to a hydrocarbyl group comprising an aromatic ring structure therein.

Chemical moieties of the application can be substituted or unsubstituted unless otherwise specified. For purposes of this disclosure, and unless otherwise specified, a substituted hydrocarbyl and a substituted aryl refers to an hydrocarbyl radical and an aryl radical, respectively, in which at least one hydrogen atom has been substituted with a heteroatom or heteroatom-containing group, such as with at least one functional group, such as one or more elements from Group 13-17 of the periodic table of the elements, such as halogen (F, Cl, Br, or I), O, N, Se, Te, P, As, Sb, S, B, Si, Ge, Sn, Pb, and the like, such as NR*$_2$, OR* (e.g., OH or O$_2$H), SeR*, TeR*, PR*$_2$, AsR*$_2$, SbR*$_2$, SR*, SOX (where x=2 or 3), BR*2, SiR*$_3$, GeR*$_3$, SnR*$_3$, PbR*$_3$, and the like or where at least one heteroatom has been inserted within the hydrocarbyl radical or aryl radical such as one or more of halogen (F, Cl, Br, or I), O, S, Se, Te, NR*, PR*, AsR*, SbR*, BR*, SiR*$_2$, GeR*$_2$, SnR*$_2$, PbR*$_2$, and the like, where R* is, independently, hydrogen, hydrocarbyl (e.g., $C_1$-$C_{10}$), or two or more R* may join together to form a substituted or unsubstituted completely saturated, partially unsaturated, fully unsaturated, or aromatic cyclic or polycyclic ring structure.

Where isomers of a named molecule group exist (e.g., n-butyl, iso-butyl, sec-butyl, and tert-butyl), reference to one member of the group (e.g., n-butyl) shall expressly disclose the remaining isomers (e.g., iso-butyl, sec-butyl, and tert-butyl) in the family. Likewise, reference to a named molecule without specifying a particular isomer (e.g., butyl) expressly discloses all isomers (e.g., n-butyl, iso-butyl, sec-butyl, and tert-butyl).

As used herein, a "composition" can include component(s) of the composition and/or reaction product(s) of two or more components of the composition. Compositions of the present disclosure can be prepared by any suitable process. As used herein, a "bimetallic structure" can include component(s) of the bimetallic structure and/or reaction product(s) of two or more components of the bimetallic structure. Bimetallic structures of the present disclosure can be prepared by any suitable process.

As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "Is" preceding the recitation of the composition, element, or elements and vice versa, e.g., the terms "comprising," "consisting essentially of," "consisting of" also include the product of the combinations of elements listed after the term. Similarly, whenever a bimetallic structure, an element, or a group of elements is preceded with the transitional phrase "comprising," it is understood that we also contemplate the same bimetallic structure or group of elements with transitional phrases "consisting essentially of," "consisting of," "selected from the group of consisting of," or "Is" preceding the recitation of the bimetallic structure, element, or elements and vice versa, e.g., the terms "comprising," "consisting essentially of," "consisting of" also include the product of the combinations of elements listed after the term.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

As used herein, the indefinite article "a" or "an" shall mean "at least one" unless specified to the contrary or the context clearly indicates otherwise.

While the foregoing is directed to aspects of the present disclosure, other and further aspects of the disclosure may be devised without departing from the basic scope thereof, and the scope thereof is determined by the claims that follow.

What is claimed is:

1. A process for forming copper-containing bimetallic polyhedral nanoparticles, the process comprising:
   forming a mixture comprising a copper-alkylamine and a trialkylphosphine, the mixture having a molar ratio of the copper-alkylamine to the trialkylphosphine that is from about 10:1 to about 1:10;
   heating the mixture to an injection temperature that is from about 200° C. to about 320° C.;
   introducing a Group 8-10 metal-alkylamine with the heated mixture, the Group 8-10 metal of the Group 8-10 metal-alkylamine selected from the group consisting of Fe, Co, and Ni; and
   reacting the resultant mixture at a reaction temperature that is from about 200° C. to about 320° C. to form the copper-containing bimetallic polyhedral nanoparticles, the copper-containing bimetallic polyhedral nanoparticles having an average particle size that is from 50 nm to 350 nm, the copper-containing bimetallic polyhedral nanoparticles comprising dodecahedral structures.

2. The process of claim 1, wherein the trialkylphosphine is selected from the group consisting of trimethylphosphine, triethylphosphine, tripropylphosphine, tributylphosphine, tripentylphosphine, trihexylphosphine, trioctylphosphine, tricyclohexylphosphine, dimethylethylphosphine, isomers thereof, and combinations thereof.

3. The process of claim 1, wherein the copper-alkylamine is formed from a copper source, the copper source selected from the group consisting of a copper acetate, a copper halide, a copper nitrate, and combinations thereof.

4. The process of claim 1, wherein the Group 8-10 metal-alkylamine is formed from a Group 8-10 metal source, the Group 8-10 metal source selected from the group consisting of a metal chloride, a metal nitrate, a metal acetylacetonate, and combinations thereof.

5. The process of claim 1, wherein the alkylamine of the copper-alkylamine is selected from the group consisting of tetradecylamine, oleylamine, octadecylamine, hexadecylamine, dodecylamine, and combinations thereof.

6. The process of claim 1, wherein the alkylamine of the Group 8-10 metal-alkylamine is selected from the group consisting of tetradecylamine, oleylamine, octadecylamine, hexadecylamine, dodecylamine, and combinations thereof.

7. The process of claim 1, wherein the trialkylphosphine is selected from the group consisting of trioctylphosphine, tributylphosphine, or combinations thereof.

8. The process of claim 1, wherein the Group 8-10 metal of the Group 8-10 metal-alkylamine is selected from the group consisting of Fe and Co.

9. The process of claim 1, wherein:
   the copper-containing bimetallic polyhedral nanoparticles are in the form of a core-shell structure;
   the core of the core-shell structure comprising the copper and the Group 8-10 metal, the core having a greater amount of copper than the Group 8-10 metal; and
   the shell of the core-shell structure comprising copper and the Group 8-10 metal, the shell having a greater amount of the Group 8-10 metal than copper.

10. The process of claim 1, wherein the Group 8-10 metal of the Group 8-10 metal-alkylamine is Ni.

* * * * *